(12) United States Patent
Klein et al.

(10) Patent No.: US 11,449,295 B2
(45) Date of Patent: *Sep. 20, 2022

(54) INTERCHANGEABLE DEVICE COMPONENTS

(71) Applicant: Microsoft Technology Licensing, LLC, Redmond, WA (US)

(72) Inventors: Christian Klein, Duvall, WA (US); Robert Joseph Disano, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/928,182

(22) Filed: Jul. 14, 2020

(65) Prior Publication Data

US 2020/0341586 A1  Oct. 29, 2020

Related U.S. Application Data

(63) Continuation of application No. 15/834,343, filed on Dec. 7, 2017, now Pat. No. 10,884,547.

(Continued)

(51) Int. Cl.
*G06F 3/14* (2006.01)
*G06F 9/4401* (2018.01)
(Continued)

(52) U.S. Cl.
CPC .......... *G06F 3/1423* (2013.01); *G06F 1/1615* (2013.01); *G06F 1/1616* (2013.01);
(Continued)

(58) Field of Classification Search
CPC ... G06F 1/32; G06F 1/12; G06F 21/57; G06F 9/44
See application file for complete search history.

(56) References Cited

U.S. PATENT DOCUMENTS 6,269,043 B1 * 7/2001 Batcher ................. G06F 1/3203
365/227
2008/0005679 A1 * 1/2008 Rimas-Ribikauskas ....................
H04L 67/303
715/745

(Continued)

FOREIGN PATENT DOCUMENTS

| CN | 105868010 A | 8/2016 |
| CN | 106557295 A | 4/2017 |
| EP | 2565763 A1 | 3/2013 |

OTHER PUBLICATIONS

"Non Final Office Action Issued in U.S. Appl. No. 16/709,161", dated Jul. 1, 2020, 6 Pages.

(Continued)

*Primary Examiner* — Keshab R Pandey

(57) ABSTRACT

Implementations described herein provide a component system that reconfigures interchangeable computing device components based on a current state of the computing device. The current state of the computing device is determined based on a hardware configuration of the device, a shell configuration describing software and firmware of the device, and/or context information describing a relationship between the device and its surrounding environment. Based on the current state of the computing device, an output is determined that specifies interchangeable components are to be activated and deactivated. The output is useable to reconfigure individual computing device functionalities, control a manner in which applications execute on the computing device, and adapt the computing device to its current state.

15 Claims, 11 Drawing Sheets

Related U.S. Application Data

(60) Provisional application No. 62/505,942, filed on May 14, 2017.

(51) Int. Cl.

| | | |
|---|---|---|
| *G06F 1/16* | (2006.01) | |
| *G06F 9/445* | (2018.01) | |
| *G06F 3/0487* | (2013.01) | |
| *G06F 1/32* | (2019.01) | |
| *G06F 3/041* | (2006.01) | |
| *G09G 5/00* | (2006.01) | |
| *G09G 5/14* | (2006.01) | |
| *G06F 3/01* | (2006.01) | |
| *G06F 3/0354* | (2013.01) | |
| *G06F 3/04883* | (2022.01) | |
| *G06F 9/451* | (2018.01) | |
| *G06V 10/96* | (2022.01) | |
| *G06V 30/32* | (2022.01) | |
| *G06V 30/142* | (2022.01) | |
| *G06V 40/30* | (2022.01) | |

(52) U.S. Cl.
CPC .......... *G06F 1/1618* (2013.01); *G06F 1/1641* (2013.01); *G06F 1/1647* (2013.01); *G06F 1/1677* (2013.01); *G06F 1/1681* (2013.01); *G06F 1/1692* (2013.01); *G06F 1/1694* (2013.01); *G06F 1/32* (2013.01); *G06F 3/011* (2013.01); *G06F 3/017* (2013.01); *G06F 3/03545* (2013.01); *G06F 3/0418* (2013.01); *G06F 3/0487* (2013.01); *G06F 3/04883* (2013.01); *G06F 3/1446* (2013.01); *G06F 9/4401* (2013.01); *G06F 9/445* (2013.01); *G06F 9/4411* (2013.01); *G06F 9/44505* (2013.01); *G09G 5/003* (2013.01); *G09G 5/14* (2013.01); *G06F 1/1643* (2013.01); *G06F 3/041* (2013.01); *G06F 9/451* (2018.02); *G06F 2200/1637* (2013.01); *G06F 2203/04803* (2013.01); *G06V 10/96* (2022.01); *G06V 30/1423* (2022.01); *G06V 30/347* (2022.01); *G06V 30/36* (2022.01); *G06V 40/30* (2022.01); *G09G 2320/0626* (2013.01); *G09G 2320/0686* (2013.01); *G09G 2330/021* (2013.01); *G09G 2330/022* (2013.01); *G09G 2340/0407* (2013.01); *G09G 2354/00* (2013.01); *G09G 2356/00* (2013.01); *G09G 2360/144* (2013.01); *G09G 2370/022* (2013.01)

(56) References Cited

U.S. PATENT DOCUMENTS

| | | |
|---|---|---|
| 2014/0189395 A1 | 7/2014 | KP |
| 2015/0074687 A1 | 3/2015 | Ji |
| 2016/0098760 A1* | 4/2016 | Keller .................. G06F 3/0482 705/14.46 |
| 2016/0239317 A1 | 8/2016 | Cuddihy et al. |
| 2016/0277235 A1* | 9/2016 | Bhesania .............. H04W 84/20 |
| 2017/0003858 A1 | 1/2017 | Kocharlakota |
| 2017/0115782 A1* | 4/2017 | Hinckley ............... H04N 5/225 |
| 2017/0142589 A1* | 5/2017 | Park .................... H04W 12/086 |

OTHER PUBLICATIONS

"Extended European Search Report Issued in European Patent Application No. 20180466.3", dated Nov. 5, 2020, 08 Pages.

"Office Action Issued in European Patent Application No. 18727075.6", dated Sep. 23, 2021, 6 Pages.

"Office Action Issued in European Patent Application No. 18725694.6", dated Dec. 8, 2021, 7 Pages.

"Office Action Issued in European Patent Application No. 20180466.3", dated Jul. 4, 2022, 7 Pages.

"Office Action Issued in Indian Patent Application No. 201947048046", dated Jun. 9, 2022, 8 Pages.

* cited by examiner

INTERCHANGEABLE DEVICE COMPONENTS

RELATED APPLICATION

This application claims priority under 35 U.S.C. § 119(e) to U.S. Provisional Patent Application No. 62/505,942, filed on May 14, 2017 entitled "Multi-Display Device Techniques," the entire disclosure of which is incorporated by reference in its entirety. Further, this application is a continuation of and further claims priority to U.S. Non-Provisional patent application Ser. No. 15/834,343 entitled "INTERCHANGEABLE DEVICE COMPONENTS", filed on Dec. 7, 2017, which is hereby incorporated by reference herein, in its entirety.

BACKGROUND

Computing device functionalities are often designed for specific devices, such that similar functionalities operate differently on different devices. For example, functionality for rendering an operating system user interface may result in different user interfaces when implemented by different device types, such as a mobile device and a television device. Conventional techniques for reconfiguring a functionality from its default state for a given device often require manual installation and rebooting in order for the reconfiguration to take effect. Thus, conventional techniques for reconfiguring computing device functionalities are often unable to adapt to changes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Implementations described herein provide a component system for configuring individual functionalities of a computing device based on a current state of the computing device. Individual computing device functionalities (e.g., an operating system, input/output mechanisms, system services, and so forth) are associated with interchangeable components that can be separately applied to reconfigure operation of the functionalities. In at least one implementation, the functionalities are reconfigurable based on a state of the computing device. Accordingly, a state of the computing device is determined based on a hardware configuration available to the device, a shell configuration describing software and firmware available to the device, context information describing a relationship between the device and its surrounding environment, and so forth. Based on the state of the computing device, a configuration output is determined that specifies interchangeable components that are to be activated and/or deactivated. The configuration output is useable for various purposes, such as to reconfigure individual computing device functionalities, control a manner in which applications execute on the computing device, and adapt the computing device to its current state.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
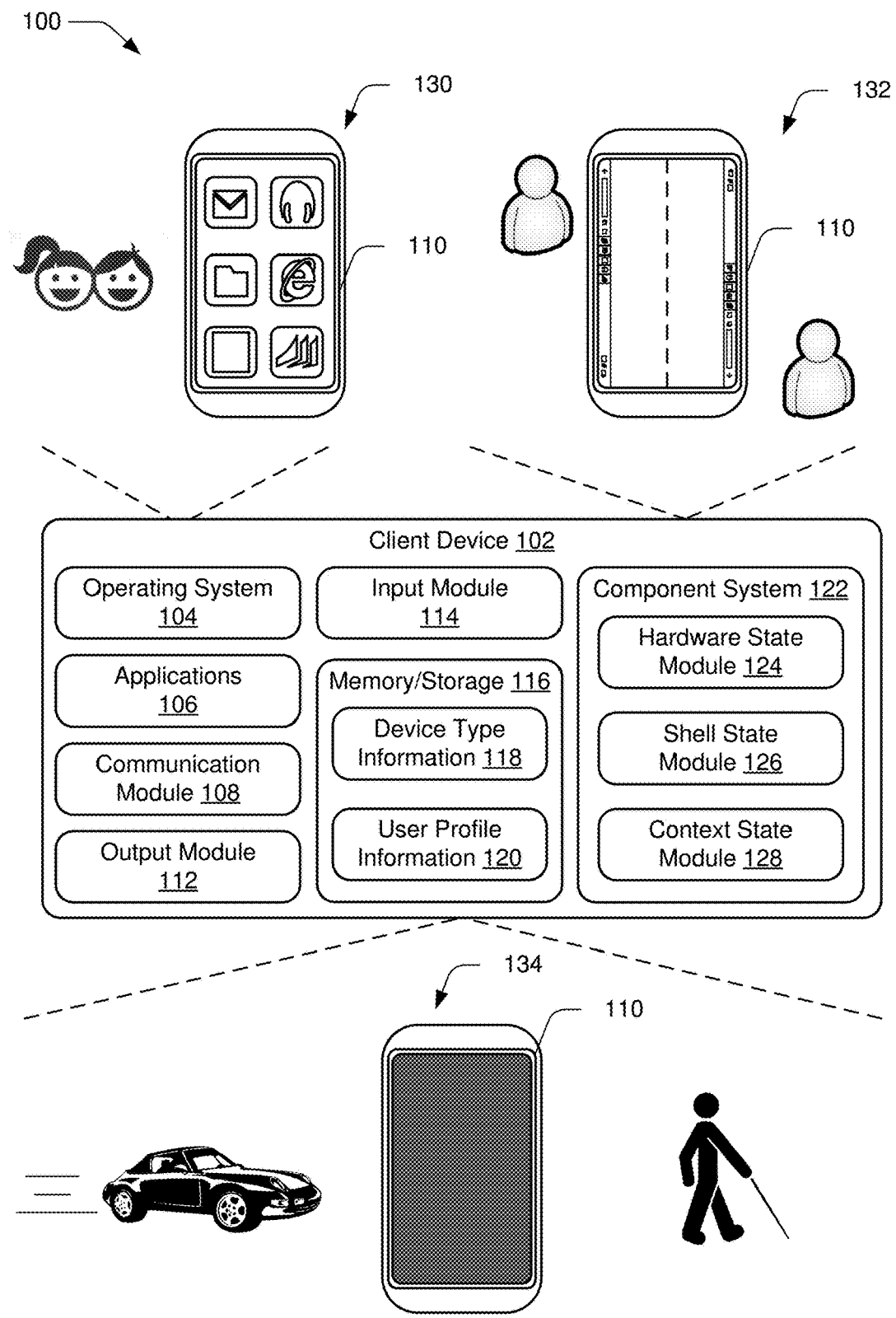
FIG. 1 is an illustration of an environment in an example implementation that is operable to employ techniques discussed herein in accordance with one or more implementations.

Implementations described herein enable configuration of a computing device, such as through activation and deactivation of interchangeable components based on a current state of the computing device. Generally, individual interchangeable components are useable to configure functionality of the computing device and are modular in the sense that they can be applied to a range of different device types and device states. Accordingly, the computing device can be reconfigured by activating and deactivating various components in order to adapt to a current state. Similarly, a manner in which applications execute on the computing device can be dictated by representing the computing device as a set of selected components.

For instance, consider a scenario where a first user is interacting with a mobile device via touch inputs to an integrated touchscreen. Using techniques described herein, the mobile device is configured based on its current state. As described herein, a current state for the mobile device can be defined based on information describing a hardware state, a shell state, and a context state of the mobile device. A change in state may occur, for example, when the mobile device is passed from the first user to a second, visually impaired user. This change in state can be communicated to the mobile device based on updated context information identifying the second user as being visually impaired and being the current primary user of the device. Based on this updated context information, the mobile device's touchscreen can be reconfigured in real time to adapt to the current device state. For instance, a component corresponding to visual output functionality of the touchscreen can be disabled and a component corresponding to functionality of a screen narrator can be enabled based on the context information indicating that the second user is visually impaired. Alternatively, a component corresponding to functionality of the touchscreen can be replaced with a different component that corresponds to a large text functionality of the touchscreen when the context information indicates that the second user suffers from presbyopia.

Implementations are also operable to cause an application to execute on a computing device in a certain manner by representing the computing device to the application as being a set of interchangeable components. For instance, an application may be designed to have a first user experience while executing on a device with an integrated camera and a second, different user experience while executing on a device with no integrated camera. The first user experience, for example, may include a display area with an icon for accessing camera functionality while the second user experience includes an icon for accessing a freeform drawing program in the same display area. As an example, consider a scenario where the application is executing on a device with an integrated camera, but a user's hand is covering the integrated camera. Using techniques described herein, the device may be represented to the application as a set of components that excludes the integrated camera, thereby causing the application execute as if no integrated camera exists on the device and display the freeform drawing icon instead of the camera icon.

Thus, techniques described herein enable configuring a computing device and its individual functionalities, such as during runtime, based on a state of the computing device. The described techniques may improve device performance in a number of ways, such as by enabling certain device components to be disabled and thus reduce power consumption and/or increase battery charge life, by reducing processor load by reducing a number of active components and thus data from the components that requires processing, and so forth.

FIG. 1 is an illustration of an environment 100 in an example implementation that is operable to employ techniques for configuring interchangeable components of a client device based on a state of the client device. Environment 100 includes a client device 102 which can be embodied as any suitable device such as, by way of example and not limitation, a smartphone, a tablet computer, a portable computer (e.g., a laptop), a desktop computer, a wearable device, a device integrated into clothing, and so forth. In at least some implementations, the client device 102 represents a smart appliance, such as an Internet of Things ("IoT") device. Thus, the client device 102 may range from a system with significant processing power, to a lightweight device with minimal processing power. One of a variety of different examples of the client device 102 is shown and described below in FIG. 11.

The client device 102 includes a variety of different functionalities that enable various activities and tasks to be performed. For instance, the client device 102 includes an operating system 104, applications 106, and a communication module 108. Generally, the operating system 104 is representative of functionality for abstracting various system components of the client device 102, such as hardware, kernel-level modules and services, and so forth. The operating system 104, for instance, can abstract various components (e.g., hardware, software, and firmware) of the client device 102 to the applications 106 to enable interaction between the components and the applications 106.

The applications 106 represents functionalities for performing different tasks via the client device 102. Examples of the applications 106 include a word processing application, a spreadsheet application, a web browser, a gaming application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 108 is representative of functionality for enabling the client device 102 to communicate over wired and/or wireless connections. For instance, the communication module 108 represents hardware and logic for communication via a variety of different wired and/or wireless technologies and protocols.

The client device 102 further includes a display device 110, an output module 112, and an input module 114. The display device 110 generally represents functionality for visual output for the client device 102. The display device 110, for instance, represents an instance of an output mechanism supported by the output module 112. Additionally, in some implementations the display device 110 represents functionality for receiving various types of input, such as touch input, pen input, and so forth. The display device 110, for instance, represents an instance of an input mechanism supported by the input module 114, such that the display device 110 is configured to receive touch based inputs from a user's hand, a stylus, and so forth.

The output module 112 is representative of functionality for generating data for output via one or more output mechanisms of the client device 102, such as generating audio data for output at a speaker of the client device, generating visual data for output at the display device 110, generating haptic feedback for output via the display device 110, and so on. The output module 112, for instance, includes a rendering engine that can process and output data for display on the display device 110.

The input module 114 is representative of functionality for receiving input to the client device 102 via one or more input mechanisms of the client device. The input module 114, for instance, includes an input mapping system that maps input signals to various functionalities of the client device 102 based on a current state of the client device. For example, the input module 114 may employ target disambiguation techniques for input signals generated by touch input devices to determine an intended input location based on received touch input in a manner that accounts for variations in user input.

The input module 114, for instance, may perform input target disambiguation with a relatively small factor for input variation when an adult user is interacting with the client device 102. Using techniques described herein, the input module 114 may be dynamically reconfigured to perform target disambiguation with a relatively large factor for input variation when a child user is interacting with the client device 102. In this manner, the input module 114 can be configured to alter a user experience for an operating system, application, module, and so forth, based on a hardware state, a shell state, or a context state for the client device 102.

In order to assist in determining a current state of the client device 102, the client device 102 additionally includes memory/storage 116 storing device type information 118 as well as user profile information 120. The device type information 118 describes the client device 102, such as by a serial number, a manufacturer, a model, a hardware specification, a software specification, combinations thereof, and so forth. Alternatively or additionally, the device type information 118 describes current and historical activity for the operating system 104, applications 106, communication module 108, output module 112, and/or input module 114. Generally, the user profile information 120 describes one or more user profiles associated with the client device. For instance, a user profile can include information describing a particular user, such as a user's age, a user's accessibility needs, and so forth. Alternatively or additionally, the user profile information 120 includes historical data describing a manner in which the particular user interacts with the client device 102, such as voice training data, gesture training data, recorded input data, and so forth.

The client device 102 additionally includes a component system 122, which is representative of functionality for determining a current state of a the client device, based on a hardware state, a shell state, and a context state of the client device, and generating an output based on the current state. For instance, the component system 122 includes a hardware state module 124, a shell state module 126, and a context state module 128. As described herein, the hardware state module 124 is representative of functionality for monitoring a hardware state of the client device 102, which describes one or more hardware devices that are available to the client device. For instance, a current hardware state of the client device 102 may be defined by one or more input and output devices that are available to the client device, a hardware specification of the client device, and/or hardware specifications of one or more devices connected to the client device. In some implementations, the hardware state module 124 determines a hardware state of the client device 102 based on the device type information 118.

The shell state module 126 is representative of functionality for monitoring a shell state of the client device 102, which describes software and firmware available to the client device. For instance, the shell state of the client device 102 may describe versions of the operating system 104, the applications 106, the communication module 108, the output module 112, and/or the input module 114 that are available for use by the client device 102.

The context state module 128 is representative of functionality for monitoring a context state of the client device 102, which describes the client device 102 in relation to a surrounding environment (e.g., in relation to a user of the device and how the user is using the device). For instance, the context state of the client device 102 can be described by data or signals associated with a user's grip on the device, a relative position of the device, sound, behavioral data, Hall Effect, user settings, visual data, external connections, combinations thereof, and so forth. This is not an exhaustive list, and is only representative of various information that can be used to describe a context state of the client device 102, as described in further detail below.

The component system 122 is operable to configure the client device 102 to adapt to a current state of the device, which includes at least one of a hardware state, a shell state, or a context state of the device. In this manner, user experiences associated with the operating system 104, the applications 106, and so forth can be dynamically adapted to changes in context.

For instance, the environment 100 includes an example configuration 130, an example configuration 132, and an example configuration 134, which each represent configurations of the client device 102 that are adapted based on one or more of a hardware state, a shell state, or a context state of the client device 102. The example configuration 130 is representative of a scenario where a child user is interacting with the client device 102. In the example configuration 130, an overall user experience for the client device 102 is simplified, such as by representing functionality of the operating system 104, the applications 106, and so forth, using large icons for display instead of a desktop user experience with small icons, operating system chrome, and so forth. In some implementations, simplifying the overall user experience for the client device 102 is performed by reducing a number of interchangeable components running in parallel on the client device 102, as described in further detail below. As described herein, interchangeable components running parallel on the client device 102 also refers to interchangeable components that are executing concurrently on the client device 102.

The example configuration 132 is representative of a scenario where multiple users are simultaneously interacting with the client device 102. In the example configuration 132, two users are illustrated as simultaneously interacting with opposite sides of the client device 102. Thus, in order to provide simultaneous access to functionalities of the client device 102, the example configuration 132 includes two user interfaces with duplicate instances of the operating system 104, the applications 106, and so forth, which are simultaneously accessible by the two users.

In some implementations, configuring the client device 102 to accommodate multiple users is performed by creating duplicate instances of one or more components running on the client device and thus increasing a number of interchangeable components running in parallel on the client device. As described herein, a duplicate instance of a client device component can function independently with respect to the client device component from which it was generated. Thus, a first user can interact with the operating system 104 via client device 102 while a second user simultaneously interacts with the operating system 104 in a different manner, without affecting the other user's experience. Alternatively, the duplicate instances of the client device components can simultaneously perform the same functionality.

The example configuration 134 is representative of a scenario where the display device 110 is disabled based on a current state of the client device 102, which can be defined by one or more of a hardware state, a shell state, or a context state of the client device 102. For instance, the example configuration 134 may be representative of a scenario where the client device 102 is communicatively coupled to an automobile while the automobile is moving. In this scenario, a component corresponding to functionality of the display device 110 is disabled to reduce potential distractions that may otherwise occur from a user looking at the display device 110 while driving. Continuing this example scenario, if the client device 102 is connected to automobile hardware devices, such as an integrated display device, microphone, speaker system, and so forth, input and output to the client device 102 may be redirected to the automobile hardware devices rather than input and output mechanisms of the client device 102.

Alternatively or additionally, the example configuration 134 may be representative of a scenario where the client device 102 is configured for a user with vision accessibility needs. In this example scenario, if a visually impaired user is interacting with the client device 102, visual output at the display device 110 may be ineffective in communicating information. Thus, the display device 110 may be disabled by deactivating a component corresponding to functionality of the display device 110. Instead, a component corresponding to functionality of a screen narrator may be activated to configure the client device 102 for the visually impaired user. Thus, using techniques described herein, the client device 102 can be adapted to different configurations based on a current state of the client device.

Having described an example environment in which techniques described herein may operate, consider now a discussion of some example implementation scenarios for configuring a client device using a component system in accordance with one or more implementations. The implementation scenarios may be implemented in the environment 100 described above, the system 1100 of FIG. 11, and/or any other suitable environment.

Figure 2:
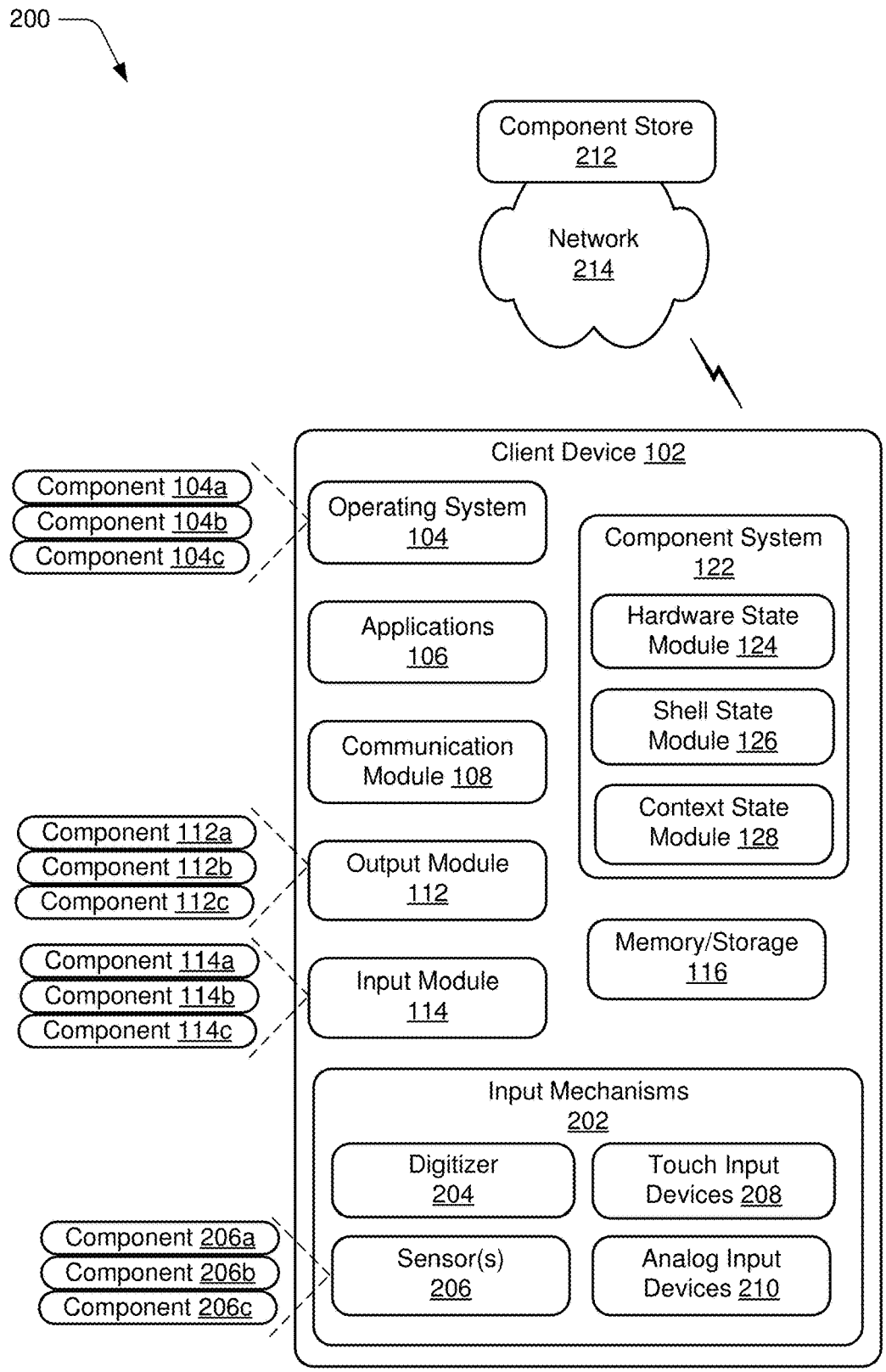
FIG. 2 depicts an example implementation scenario for interchangeable device components in accordance with one or more implementations.

FIG. 2 depicts an example implementation scenario 200 for enabling componentized, modular functionality of the client device 102. The scenario 200 shows that different functionalities of the client device 102 are associated with different interchangeable components, such as the operating system 104, the output module 112, the input module 114, and sensors 206. Using techniques described herein, each component can be separately applied to reconfigure operation of a respective functionality. Thus, each functionality of the client device 102 can be reconfigured with a respective component and based on a variety of different criteria, such as one or more of a hardware state, a shell state, or a context state of the client device 102.

For instance, components can be interchanged by activating or deactivating individual components based on a change in the hardware state, a shell state, or a context state of the client device 102. For instance, components can be interchanged based on a change in device position and/or posture of the client device 102, based on a change in environmental factors (e.g., light level, time of day, temperature, and so forth), based on a change in how a user is holding the client device 102 (e.g., a change in grip), a change in user identity for a user that is interacting with the client device 102, and so forth.

Consider, for example, that the components 104a-104c are interchangeable to reconfigure the operating system 104. For instance, when the client device 102 detects that a child user is interacting with the client device 102, one of the components 104a-104c can be selected that reconfigures the operating system 104 to provide a simplified user experience. As an example, a component 104b can be selected that displays a user interface for the operating system 104 as a collection of enlarged icons. Conversely, a component 104a can be selected upon detecting that an adult user is interacting with the client device 102 to provide a desktop user interface for the operating system 104 that enables the adult user to access additional functionality not enabled by the component 104b selected for a child user.

According to some implementations, an application 106 can be handled as one of the components 104a-104c of the operating system 104. For instance, when the client device 102 is powered on and the operating system 104 is booted, the application 106 can be automatically launched and executed on the client device 102 without requiring explicit user input to launch the application 106. Thus, the application 106 can be bound to the operating system 104, such as based on explicit user preferences and/or detected hardware and context factors. For instance, when the operating system 104 is booted and the application 106 is launched, the status of the application 106 on the client device 102 can be indicated as a system component rather than a separate, executing application.

As another example, consider that the components 112a-112c are interchangeable to configure the output module 112. For instance, when the client device 102 pairs with another device, such as with an automobile, one of the components 112a-112c can be selected that reconfigures the output module 112 to utilize an output mechanism of the automobile rather than an output mechanism of the client device 102. As an example, a component 112c can be selected that causes audio output from the client device 102 to emit from an automobile speaker rather than a speaker integrated into the client device 102. As an alternative or additional example, a component 112b can be deactivated when the client device 102 pairs with the automobile to deactivate the display device 110 while the client device 102 and the automobile are paired and when the automobile is moving.

As an alternative or additional example, components 114a-114c are interchangeable to reconfigure the input module 114. For instance, when the client device 102 detects that a user may have an impairment due to a physical and/or environmental condition, one of the components 114a-114c can be selected that reconfigures the input module 114 to account for the impairment. As an example, upon detecting that a visually impaired user is interacting with the device, a component 114a can be selected that enlarges visual input functionality that is displayed by the client device 102, such as to better enable the user to interact with an intended input target.

In addition or alternatively to selecting a component based on user identity, a component may be selected based on a change in environmental factors. For instance, a component 114a can be interchanged with a component 114c in response to detecting that the client device 102 is being used in a low-light environmental setting, such as to reduce a display brightness of visual input functionality that is displayed by the client device 102.

In the example implementation scenario 200, the client device 102 is illustrated as including input mechanisms 202. The input mechanisms 202 generally represent different functionalities for receiving input to the client device 102, and include a digitizer 204, one or more sensors 206, touch input devices 208, and analog input devices 210. Examples of the input mechanisms 202 thus include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 202 may be separate or integral with the display device 110, with integral examples including gesture-sensitive displays with integrated touch-sensitive or motion-sensitive sensors.

Each input mechanism 202 may be associated with interchangeable components to reconfigure the input mechanism. For instance, the components 206a-206c are interchangeable to reconfigure the sensors 206. In an example scenario, sensors 206 may include an image sensor, where a component 206a is representative of a configuration for the image sensor in normal lighting conditions and a component 206b is representative of a configuration for the image sensor in low-light conditions. Continuing this example scenario, a component 206c is representative of a configuration in which the image sensor is unavailable, such as when the image sensor is disabled or when the image sensor is covered by a user's grip on the client device 102.

Based on a current state of the client device 102, the component system 122 configures the image sensor by activating or deactivating different ones of the components 206a-206c at runtime. For instance, the component system 122 may activate a component 206c in response to a determination by the context state module 128 that a user's finger is covering a lens of the camera. Likewise, the component system 122 may selectively activate a component 206a and a component 206b based on a detected time of day, an amount of light received by the image sensor, and so forth. Additionally or alternatively, a component may be disabled based on a current state of the client device 102. For instance, component 206a and component 206b may be disabled when a battery level of the client device drops below a threshold to conserve battery power.

In at least some implementations, different components can be obtained from a network resource, such as from a component store 212 over a network 214. The component store 212, for instance, can enable various types and combinations of interchangeable components to be obtained by the client device 102.

Figure 3:
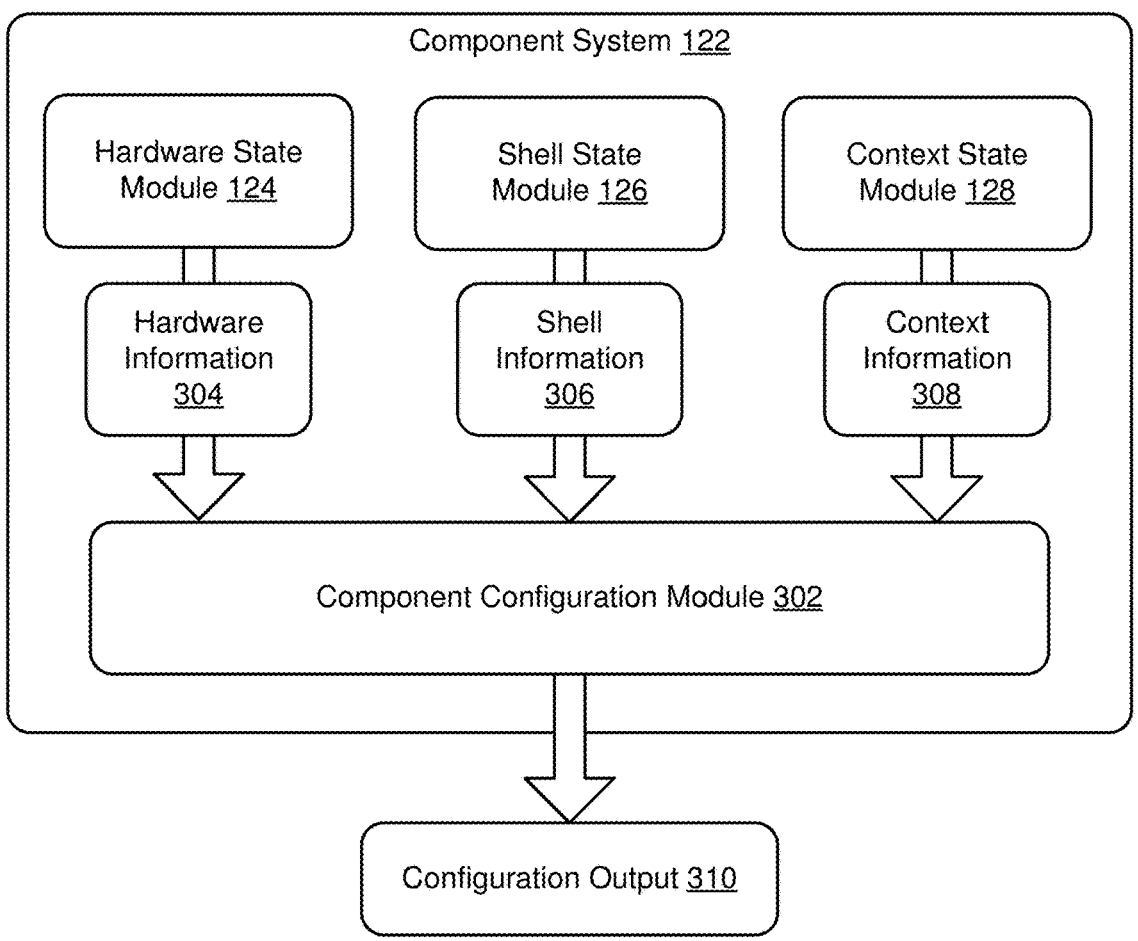
FIG. 3 depicts an example implementation scenario for generating an output for interchangeable device components in accordance with one or more implementations.

FIG. 3 depicts an example implementation scenario 300 for generating an output based on one or more of a device's hardware state, a shell state, or a context state in accordance with one or more implementations. The scenario 300 includes the component system 122 and the hardware state module 124, shell state module 126, and context state module 128, as introduced in FIG. 1. The component system 122 additionally includes a component configuration module 302, which is configured to receive hardware information 304, shell information 306, and context information 308. Based on at least one of the hardware information 304, shell information 306, or context information 308, the component configuration module 302 generates a configuration output 310 in order to dynamically adapt the client device 102 based on a state of the device.

The hardware information 304 describes a hardware state of the client device 102, such as a manufacturer of the device, a make of the device, a model of the device, a description of hardware components installed on the device, and so forth. In some implementations, the hardware state module 124 determines the hardware information 304 based on the device type information 118, as introduced in FIG. 1. The hardware information 304 also describes input and output devices that are available for use by the client device 102, such as the display device 110 and the input mechanisms 202.

In some implementations, the hardware information 304 describes a hardware configuration of a computing device that is communicatively connected to the client device 102. For instance, in an implementation where the client device 102 is paired with one or more different computing devices, the hardware information 304 includes information describing hardware configurations of each of the different computing devices, as well as information describing input and output devices that are available for use by the client device 102 via the different computing devices.

As an example, the hardware information 304 may specify that the client device 102 is a desktop computing device with an Brand X ver. 1.5 processor, keyboard, mouse, and camera input mechanisms 202, two display monitors, and an integrated speaker system. The hardware information 304 may additionally specify that the client device 102 is paired with a mobile computing device via Bluetooth, and that the mobile computing device includes a microphone, touchscreen and camera input mechanisms, and an integrated display device. Thus, the hardware information 304 is useable to describe a hardware state of a client device, such that the component system 122 can specifically determine a current hardware configuration and hardware components available to the client device 102 at runtime.

The shell information 306 describes a shell state of the client device 102, such as software and firmware available to the client device 102. In some implementations, the shell state module 126 determines the shell information 306 based on the device type information 118, as introduced in FIG. 1. The shell information 306, for instance, describes a current version of the operating system 104, the applications 106, the communication module 108, the output module 112, and/or the input module 114 that are available for use by the client device 102.

For example, developers often design applications to have different user experiences on different device types. As such, an application 106 may be developed to include a desktop version designed for implementation on a desktop computing device and a mobile version designed for implementation on a mobile device. The shell information 306 can thus specify that a component for a desktop version of an application 106 is currently installed on client device 102, but that a mobile version of the application 106 is additionally available, such as from the component store 212 via the network 214, as introduced in FIG. 2.

In some implementations, the shell information 306 describes a shell state of a computing device that is communicatively coupled to the client device 102. For instance, in an implementation where the client device 102 is paired with a mobile device, the shell information 306 includes information describing software and firmware installed on both the client device 102 as well as the mobile device. As an example, the shell information 306 may specify that the client device 102 is running a third build of a Brand Y operating system and that the mobile device is running a fourth build of a Brand Y operating system.

Alternatively or additionally, the shell information 306 may describe one or more applications 106 and their respective versions installed on the client device 102 as well as applications and their respective versions installed on the mobile device. Thus, the shell information is useable to describe a shell state of the client device 102, such that the component system 122 can specifically determine a current software and firmware configuration of the client device 102, as well as software and firmware configurations that are available to the client device at runtime.

The context information 308 describes a current context state of the client device 102, such as information describing the client device 102 in relation to a user of the device, how the user is using the device, and so forth. Thus, context information 308 can include any type of data or signals that are useable to describe a current state of the client device 102 in relation to its surrounding environment. For instance, the context information 308 can include data or signals associated with one or more of a user's grip on the device, a relative position of the device, sound detected in a surrounding environment, behavioral data, Hall Effect, user settings, visual data, external connections, and so on. This list of context information is not exhaustive and thus not to be construed as limiting with respect to examples of context information 308, as described in further detail below.

One example of context information 308 is information describing a user's grip on the client device 102 during operation of the device. For instance, information describing the user's grip can be detected by one or more of the input mechanisms 202, such as by the sensors 206, as introduced in FIG. 2. As an example, a user's grip on the client device 102 can be detected by capacitive strips on the outside of the client device and/or separate capacitive sensors on the rear exterior of the client device 102. Alternatively or additionally, the user's grip can be detected based on a capacitance of a display surface of the client device 102, such as display device 110. Information describing the grip can specify whether the user has fingers wrapped around the client device 102, which hand (e.g., left or right hand) the user is using the hold the client device 102, in which of a variety of different postures the user is holding the device, and so on. Accordingly, context information 308 describing a user's grip indicates how the user is holding the client device 102, which is useable to infer how the user intends to use the device.

Another example of context information 308 is a relative position of the client device 102, such as in relation to a user of the client device 102, in relation to the ground, and/or in relation to another reference location. For example, information describing a relative position of the client device 102 can indicate whether the client device is resting on a surface or whether the display device 110 is facing the user. In implementations, information describing a relative position of the client device 102 can be used to determine a current posture of the client device 102. Various types of sensors, such as sensors 206, can be employed to determine a relative position of the client device, including cameras, accelerometers, magnetometers, and so on. Thus, context information 308 may be used to describe the client device 102 relative to its surrounding environment.

Another example of context information 308 is a sound detected by the client device 102, such as to enable a user to initiate device commands audibly. For example, one or more audio sensors can be utilized to detect spoken commands by a user of the client device 102 and an approximate direction and/or distance of the audio source (e.g., the user) relative to the client device 102. In this manner, the context information 308 can describe that the user is interacting with the client device 102 via audible commands rather than through touch input devices 208, as introduced in FIG. 2. The sound may also be used to describe a noise level of the environment surrounding client device 102. For instance, the context information 308 may describe whether the client device 102 is being operated in a noisy environment, a quiet environment, and so forth. Thus, context information 308 may be used to describe sounds detected by the client device 102.

Another example of context information 308 is behavioral data, which is representative of how a user tends to interact with the client device 102 or particular applications 106 executed on the client device 102. For example, when using the client device 102 in a configuration with two or more display devices, the user may tend to run certain applications on a left display device and other applications on a right display device. In another example, the user may generally take notes on a right side of the display device 110 because the user is right-handed. As a result, the context information 308 may be used to generate a configuration output 310 that biases displayed information to a left side of the display device 110, such that the user's right hand does not obscure displayed information. In some implementations, the context state module 128 ascertains behavioral data from the user profile information 120, as introduced in FIG. 1.

There are many different reasons why a user may have particular preferences related to how the user tends to use the client device 102. Behavioral data included in the context information 308, although it may not explicitly represent preferences in the form of settings, thus includes behavioral information describing how the user uses the device. In this manner, using context information 308, some user actions can be anticipated. For example, when a notetaking application is launched, the component system 122 can use the context information 308 to generate the configuration output 310 to launch the notetaking application via a particular display device in a scenario where the hardware information 304 indicates that the client device is connected to multiple display devices. Continuing this example, the particular display device is selected because the component system 122 is aware that the user has a preference for viewing the notetaking application via the particular display device and that the user likely intends that particular display device to be the primary display.

As another example of context information 308, information describing a Hall Effect may be included, which refers to the production of a potential difference across an electrical conductor when a magnetic field is applied in a direction perpendicular to that of the flow of current. Hall Effect sensors (e.g., magnetometers) can detect magnetic fields in close proximity. In implementations, context information describing a Hall Effect can be used to detect changes in posture of the client device 102, such as when the client device is opened from a closed posture to an open posture, or vice versa. Thus, based on this Hall Effect described in context information 308, the component system 122 can be used to deactivate display devices when the client device 102 is manipulated into a closed posture, to activate one or more display devices when the client device 102 is manipulated into an open posture, and so forth.

Alternatively or additionally, the context information 308 may include information describing one or more user settings that indicate how a user tends to use the client device 102, such as with respect to ergonomics-related user settings. Ergonomics-related user settings can be used to further refine the configuration output 310 based on a current context state of the client device 102 (e.g., left/right handedness can be used to predict a likely flip direction, or hand size information can be used for more reliable grip detection). By including information associated with user settings, the context information 308 can be used to predict which direction the user is going to turn the device when the user's intent is to flip the client device 102 over.

Configuring the client device 102 based on context information 308 can be useful in differentiating situations that are similar in nature, such as a first situation where the user rotates the device 180 degrees to see the reverse side, versus a second situation where the user rotates the device 180 degrees to show a friend content displayed via the primary display. In the first situation, the configuration output 310 can cause a primary display of the client device 102 to be changed to a display device on a reverse side of the client device 102 opposite the user, to enable the user to view content via the reverse side. Conversely, in the second situation, the configuration output 310 can maintain the primary display while the primary display is temporarily facing away from the user in order to show displayed content to the friend, which accounts for the likely intent of then turning the device back around for the user to continue viewing the original primary display. Accordingly, the context information 308 is useable by the component system 122 to disambiguate similar situations.

Alternatively or additionally, user settings included in the context information 308 can include hand dimensions representing a size and shape of the user's hand(s) grasping the client device 102. The hand dimensions can then be used in conjunction with other context information 308, such as for more reliable grip detection. Similarly, the hand dimensions can be used as a manner to identify the user, the user's handedness (left or right), a shape of the user's fingers, and so on. This information can allow the system to more robustly detect how the user is holding the device, which can then be used to generate an configuration output 310 that accounts for how the user likely intends to interact with the client device 102, based on a current context state of the device.

As another example, context information 308 may describe visual data, which includes visual information captured via an input device, such as a camera of the client device 102. For example, the client device 102 can include multiple integrated cameras, such as front-facing and/or rear-facing cameras. Visual data may thus be obtained from the cameras (e.g., image and/or video data) to detect whether a corresponding surface of the client device 102 is facing a user. In implementations, the visual data can further describe a particular portion of a display device at which a user is looking. Alternatively or additionally, visual data may describe that a camera is currently covered by a user's grip on the client device, and the configuration output 310 may be generated to indicate that the covered camera is disabled or otherwise unavailable for use by the applications 106. Thus, the context information 308 can describe a context state of the client device 102 based on visual data describing an environment surrounding the client device.

As an additional example, context information 308 may include information describing one or more current connections between the client device 102 and one or more external computing devices. For example, the client device 102 can be connected to one or more external displays to display content, such as to give a presentation to a group of people. In this example, attention is given to the external device rather than the client device 102. Thus, the configuration output 310 may be generated to cause display of presentation information on the external device while displaying a user's presentation notes on a display integrated into the client device 102.

As another example, the context information 308 can include information describing an executing application 106 or the operating system 104 itself. Based on particular occurrences, the context information 308 can thus be used to anticipate a user's intended interaction with the client device 102. For example, assuming the client device 102 has the ability to switch between front and rear-facing cameras, the context information 308 may specify that a user has selected an in-application command or an operating system-related command that expresses the user's intent of performing a next action. This context information 308 can thus be used to generate an configuration output 310 that adjusts one or more detection parameters to dynamically adapt to a user's interaction with the client device, based on a current task and the indication of a subsequent task. Accordingly, the context information 308 is representative of a wide variety of data and signals that can are useable to define a current context state of the client device 102.

The component configuration module 302 is thus configured to dynamically adapt the client device 102 based on one or more of a hardware state, a shell state, or a context state of the client device, as described by the hardware information 304, shell information 306, and context information 308 via configuration output 310. In implementations, the configuration output 310 includes instructions for activating or deactivating one or more components of the client device 102, such as the various components introduced in FIG. 2.

For instance, the shell state of the client device 102 may describe versions of the operating system 104, the applications 106, the communication module 108, the output module 112, and/or the input module 114 that are available for use by the client device.

Having described some example types of hardware information 304, shell information 306, and context information 308, consider now some example configurations of the client device 102 in accordance with one or more implementations.

Figure 4:
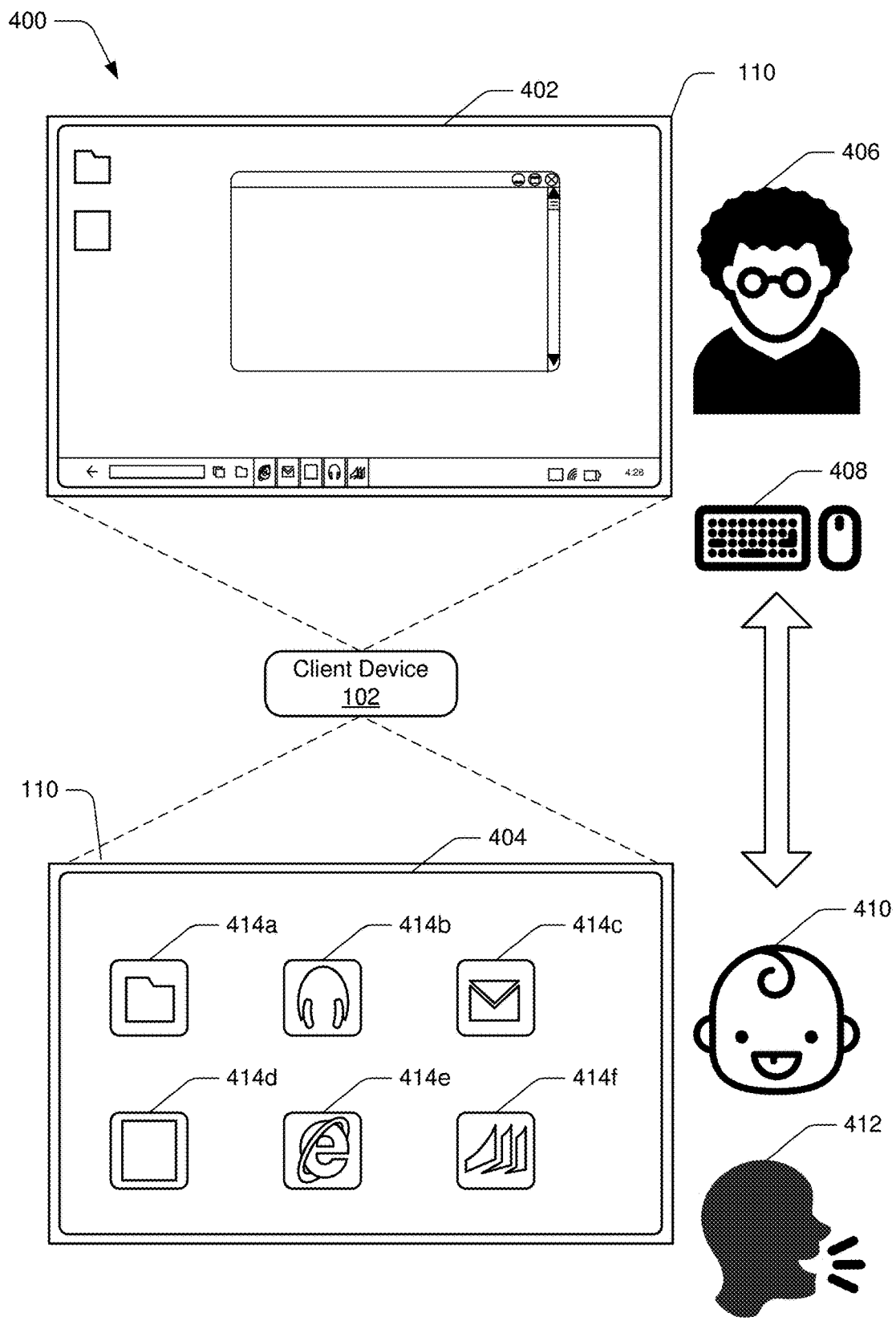
FIG. 4 depicts an example implementation scenario for configuring a client device with interchangeable device components in accordance with one or more implementations.

FIG. 4 depicts an example implementation scenario 400 for configuring the client device 102 based on at least one of a hardware state, a shell state, or a context state of the client device 102. The scenario 400 is representative of functionality provided by the component system 122 to configure the client device 102 according to a configuration 402 and a configuration 404. Using techniques described herein, the component system 122 causes the client device 102 to dynamically transition between the configuration 402 and the configuration 404 by determining at least one of a hardware state, a shell state, or a context state of the client device and generating an configuration output 310, such as illustrated in FIG. 3.

In the scenario 400, the configuration 402 represents a configuration for the client device 102 that provides a relatively complex user experience, contrasted against the configuration 404, which represents a configuration for the client device 102 that provides a relatively simple user experience. In some implementations, the relative complexity or simplicity of a user experience is defined based on a number of interchangeable components running in parallel on the client device 102. For example, the configuration 402 may represent an instance where the client device 102 is running a greater number of components in parallel than a number of components running in parallel for the configuration 404. Alternatively, the configuration 404 may represent an instance where the client device 102 is running an equal or greater number of components in parallel than a number of components running in parallel for the configuration 402, such as to address user accessibility needs.

In the scenario 400, configuration 402 is illustrated as a windowed desktop display configuration for the client device 102. In an implementation, the component system 122 may determine that an adult user 406 is interacting with the client device through context information 308 received from the context state module 128. In some implementations, the component system 122 determines that the adult user 406 is interacting with the client device 102 based on user profile information 120, as introduced in FIG. 1. Alternatively or additionally, the component system 122 may determine that the client device 102 is communicatively coupled with mouse and keyboard input mechanisms 408, which may be representative of analog input devices 210, as introduced in FIG. 2. In some implementations, the component system 122 determines that the client device 102 is communicatively coupled with mouse and keyboard input mechanisms 408 based on hardware information 304 received from the hardware state module 124.

The component system 122 may thus determine from the received hardware information 304 that the client device 102 is in a current hardware state similar to that of a desktop computing device and determine from the received context information 308 that the client device 102 is being used by an adult user 406. Based on this information describing a hardware state, a shell state, and a context state of the client device 102, the component system 122 determines that the relatively complex configuration 402 is appropriate for the current state of the client device 102. Accordingly, the component system 122 configures the client device in the configuration 402 to provide the adult user 406 with a suite of functionality offered by the operating system 104 and applications 106. Furthermore, the component system 122 configures the client device 102 in a manner that optimizes the client device for interaction via keyboard and mouse input mechanisms 408. In implementations, the component system 122 configures the client device 102 in the configuration 402 by generating an configuration output 310 that specifies a set of client device components that provide the configuration 402.

In contrast to the relatively complex configuration 402, the component system 122 can determine that the client device 102 should be reconfigured to the relatively simple configuration 404, based on a change in state to the client device 102. For example, the component system 122 may determine that the adult user 406 is no longer interacting with the client device 102 and that a child user 410 is currently interacting with the client device 102. The component system 122 may determine that the child user 410 is interacting with the client device 102 based on context information 308 received from the context state module 128. For instance, the context state module 128 may monitor input received at one or more of the input mechanisms 202 of the client device 102 and determine that touch input received from a hand of the adult user 406 has changed to touch input received from a smaller hand of the child user 410.

In response to determining this change in context state for the client device 102, the component system 122 generates an configuration output 310 that causes the client device to transition from the configuration 402 to the configuration 404 to provide a simplified user experience for the child user 410. This transition from the configuration 402 to the configuration 404 may include selectively activating a different set of interchangeable components and may also include changing a number of components running in parallel on the client device 102. In some implementations, the component system 122 identifies that the configuration 404 is associated with the child user 410 based on user profile information 120 for the child user 410, as introduced in FIG. 1.

For instance, profile information 120 for the child user 410 may indicate that the child user 410 is only permitted to access a certain subset of applications 106 via a simplified user interface that represents the subset of applications as the large icons 414a-414f. The user experience of configuration 404 is further simplified by removing operating system chrome, which refers to portions of a user interface that are part of the operating system 104 rather than any of applications 106. Thus, by detecting a change in state where the device transitions from an adult to a child user, the component system 122 can selectively activate client device components to seamlessly adapt the user experience associated with the client device 102 at runtime. Because the client device 102 can be reconfigured at runtime, the reconfiguration can be performed independent of manual user input, such as without requiring the adult user 406 to manually sign out and the child user 410 to manually sign in.

Alternatively or additionally, the component system 122 may detect a change in hardware state for the client device 102, such as a disconnection between the client device 102 and the mouse and keyboard input mechanisms 408. Upon detecting the change in hardware state, the component system 122 can ascertain that the client device 102 may be controlled using voice commands 412. For instance, the hardware state module 124 may determine that a microphone input mechanism 202 is available when the mouse and keyboard input mechanisms 408 are disconnected from the client device 102. In response to this determination, the component system 122 may generate an configuration output 310 that causes the client device 102 to transition from processing input signals received at the mouse and keyboard input mechanisms 408 to processing input signals received via the voice commands 412. In some implementations, this transition includes deactivating client device components corresponding to the mouse and keyboard input mechanisms 408 and activating one or more device components that enable the client device 102 to be controlled using voice commands 412.

Although the scenario 400 includes configurations 402 and 404, techniques described herein enable the component system 122 to adapt the client device 102 among a continuum of different configurations in order to dynamically adjust to a current state of the client device 102. For example, in a scenario where the keyboard and mouse mechanisms 408 are disconnected from the client device 102 and the adult user 406 is interacting with the client device 102, an output may be generated that configures the client device 102 in a third configuration. In this example third configuration, the client device 102 may provide a hybrid user experience that combines different aspects of the configuration 402 and the configuration 404, such as where functionality of the operating system 104 and applications 106 are displayed in a windowed desktop layout that can be interacted with using voice commands 412.

Thus, upon detecting a change to one or more of a hardware state, a shell state, or a context state of the client device 102, the component system 122 generates an output that specifies a subset of client device components to be activated, such as a subset of the components illustrated in FIG. 2. In this manner, the component system 122 dynamically adapts the client device 102 during runtime to account for state changes, such as to account for user accessibility needs, changes in available hardware, and so forth.

Figure 5:
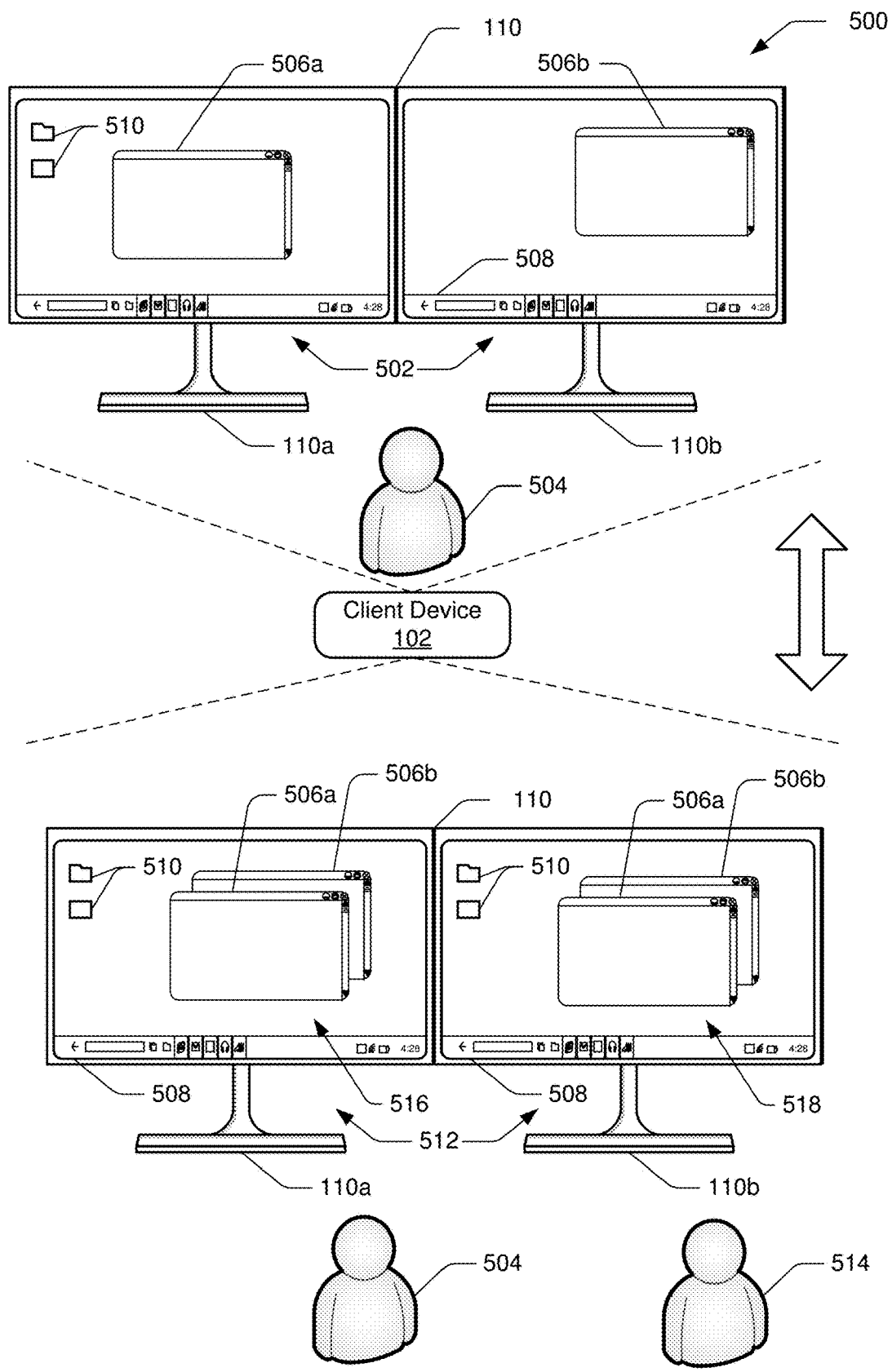
FIG. 5 depicts an example implementation scenario for configuring interchangeable device components based on a number of device users in accordance with one or more implementations.

FIG. 5 depicts an example implementation scenario 500 for configuring client device 102 based on at least one of a hardware state, a shell state, or a context state of the client device 102. The scenario 500 is representative of functionality provided by the component system 122, as introduced above.

The scenario 500 illustrates that the client device 102 is configurable according to a configuration 502. In the configuration 502, a single user 504 is illustrated as interacting with the client device 102. The client device 102 may be configured in the configuration 502, for example, based on context information 308 that indicates only one user is interacting with the client device 102. The client device 102 is illustrated as including display device 110, which in this example includes two separate display devices 110a and 110b.

In the configuration 502, the display device 110 includes a display of a windowed desktop user interface for an operating system 104 and one or more applications 106, spanning across display devices 110a and 110b. For instance, the configuration 502 includes a display of a window 506a at display device 110a, which may correspond to a designated display area for displaying operating system 104 information, application 106 information, and so on. The configuration 502 additionally includes a display of a window 506b at display device 110b, which may correspond to a designated display area for displaying operating system 104 information, application 106 information, and so on. The configuration 502 additionally includes a display of operating system chrome 508, which is represented as a taskbar displayed at a side of the display device 110 proximate to the user 504, spanning across the display devices 110a and 110b. Further, the configuration 502 includes a display of one or more icons 510, which are representative of additional client device functionality, such as an application shortcut, system controls, and so forth.

A display orientation and layout of the windows 506a and 506b, operating system chrome 508, and one or more icons 510 can thus be controlled by the component system 122, based on shell information 306 describing available components for the operating system 104 and one or more applications 106. Alternatively or additionally, the display orientations and layouts can be controlled by the component system 122 based on hardware information 304 describing various hardware components available for activation at the client device 102. Thus, the configuration 502 represents a display configuration for the client device 102 based on a hardware state of the device, a shell state of the device, and a context state of the device, where a single user 504 is interacting with the client device 102.

The lower portion of the scenario 500 illustrates that, based on a change in device context, the client device 102 is reconfigured according to a configuration 512. For instance, the display device 110 is illustrated as outputting a display for the configuration 512 where the user 504 and an additional user 514 are simultaneously interacting with the client device 102. The client device 102 may be configured in the configuration 512, for example, based on context information 308 that indicates a context state where multiple users are interacting with the device.

In the configuration 512, the display devices 110a and 110b are configured to display two separate user interfaces, such as to create a duplicate instance of the interface illustrated in the configuration 502 for the additional user 514. For instance, the configuration 512 includes a first instance of the user interface 516 for the user 504 at display device 110a and a second instance of the user interface 518 for the additional user 514 at display device 110b. The component system 122 is configured to generate multiple instances of a user interface, or user experience, provided by the client device 102 by creating multiple instances of client device components and running the multiple instances of client device components in parallel while the additional user 514 is interacting with the client device. This is represented by the first and second instances of the user interface 516 and 518 each including the windows 506a and 506b, operating system chrome 508, and one or more icons 510, as introduced in the configuration 502.

The component system 122 is additionally configured to adjust a display position and orientation of the windows 506a and 506b, operating system chrome 508, and one or more icons 510 when transitioning between the configurations 502 and 512. For instance, the component system 122 adjusts a display position of the windows 506a and 506b to display on the user interface 516, in order to maintain a user experience for the user 504 and accommodate the additional user 514.

In some implementations, the windows 506a and 506b, operating system chrome 508, and icon 510 are each representative of a different client device component. For example, the operating system chrome 508 may be representative of a component 104a, as introduced in FIG. 2. Accordingly, the component system 122 is configured to generate a new instance of the component 104a based on context information 308 that indicates the additional user 514's interaction with the client device 102. The component system 122 is additionally configured to activate the new instance of the component 104a so that the user 504 and additional user 514 can each interact with the operating system chrome 508. The component system 122 can similarly generate and activate duplicate instances of client device components corresponding to the windows 506a and 506b and one or more icons 510 to accommodate multiple users at the client device 102.

Although described in the context of two users, the component system 122 is configured to generate duplicate instances of one or more device components to accommodate any number of users simultaneously interacting with the client device 102. Likewise, in response to detecting a change in context state for the client device 102 where fewer users are interacting with the device, the component system 122 is configured to deactivate duplicate instances of the client device components, such that the client device 102 activates a number of components based on a number of users currently acting with the device.

A duplicate instance of a client device component can perform the same or different functionality as the instance of the client device component from which it was generated. For instance, assume that the operating system chrome 508 in the user interface 516 represents an instance of component 104a and that the operating system chrome 508 in the user interface 518 represents a duplicate instance of component 104a. Based on a current state of the client device 102, the component system 122 may cause the two instances of component 104a to simultaneously perform the same operations, or may allow for the instance of component 104a and the duplicate instance of component 104a to be simultaneously used for different functionality.

For example, if user 504 interacts with the operating system chrome 508 in user interface 516 to access a start menu for the operating system 104, the component system 122 can cause the operating system chrome 508 in user interface 518 to simultaneously access the same start menu for the operating system 104. In this manner, the component system 122 can activate and run additional components in parallel to effectively replicate display areas at convenient viewing angles for respective users of the client device 102. Alternatively or additionally, the component system 122 can enable the additional user 514 to access search functionality of the operating system chrome 508 in user interface 518 while the user 504 accesses a start menu of the operating system chrome 508 in user interface 516. Thus, a duplicate instance of a client device component can perform the same or different functionality as the client device component from which the duplicate instance was created.

To do so, upon detecting a change to one or more of a hardware state, a shell state, or a context state of the client device 102, the component system 122 generates an output that either increases or decreases a number of client device components running in parallel. In this manner, the component system 122 dynamically adapts the client device during runtime to account for device state changes.

Figure 6:
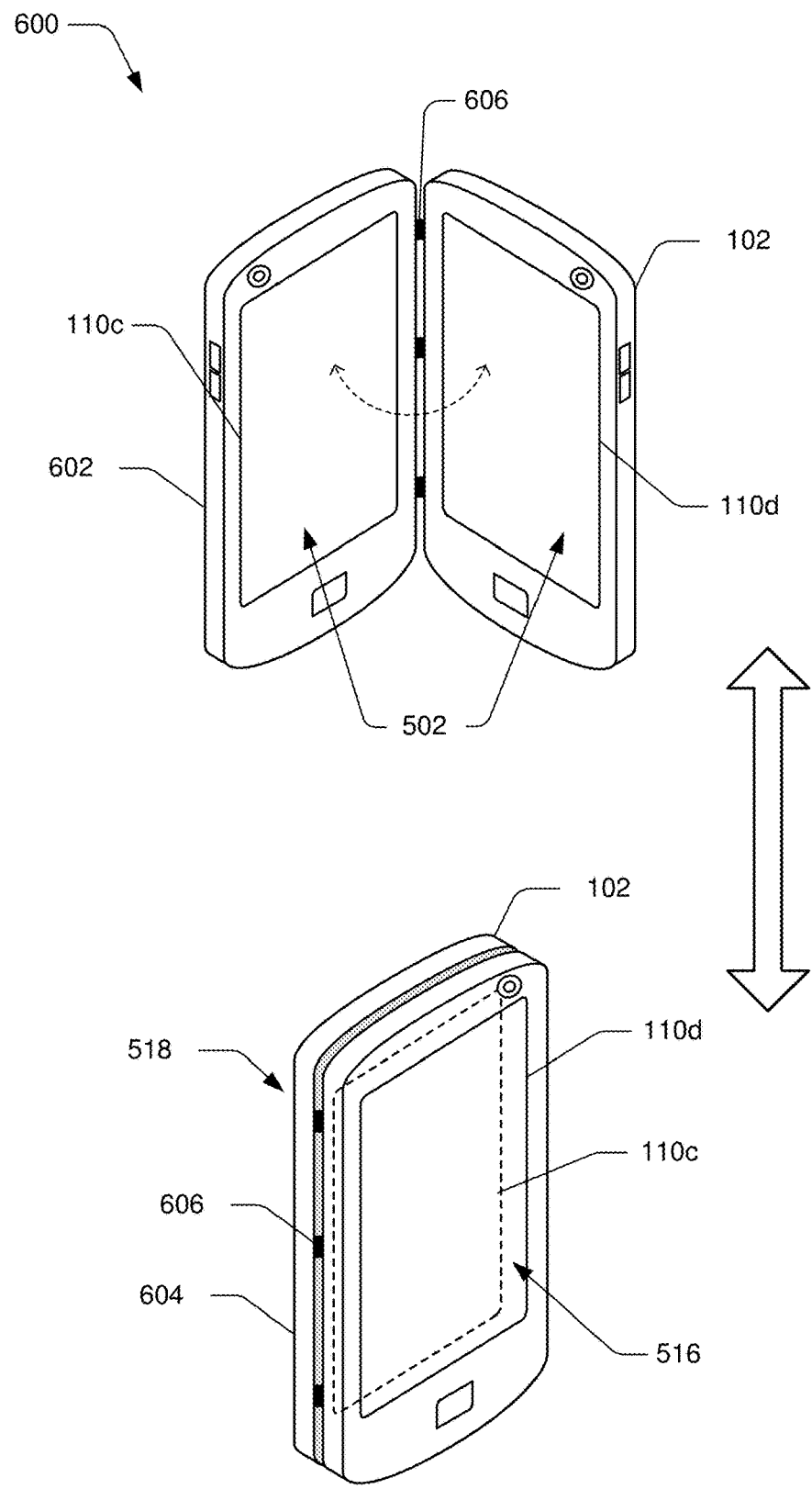
FIG. 6 depicts an example implementation scenario for configuring interchangeable device components based on a device posture change in accordance with one or more implementations.

FIG. 6 depicts an example implementation scenario 600 for configuring client device 102 based on at least one of a hardware state, a shell state, or a context state of the client device 102. The scenario 600 is representative of functionality provided by the component system 122, as introduced above. The client device 102 is illustrated as including display device 110, which comprises two separate display devices 110c and 110d. Using techniques described herein, the component system 122 selectively controls the display device 110 by dynamically transitioning between a configuration 602 and a configuration 604 by determining at least one of a hardware state, a shell state, or a context state of the client device and generating an configuration output 310, as discussed with reference to FIG. 3.

In the scenario 600, the configuration 602 represents an orientation of the client device 102 where the separate display devices 110c and 110d are oriented to face a relatively similar direction. For instance, the configuration 602 is representative of a scenario where a user of the device has oriented the display devices 110c and 110d about a hinge 606, such that the display devices 110c and 110d are both facing the user. Based on context information 308 describing the current orientation of the client device 102, the component system 122 may determine that only a single user is interacting with the client device 102 and cause the display device 110 to output information in a manner similar to the single user configuration 502, as described with respect to FIG. 5.

In the configuration 604, the client device 102 is illustrated as being oriented about the hinge 606, such that the display devices 110c and 110d are facing opposite one another. Using techniques described herein, the component system 122 is configured to monitor the client device 102 and determine that a change in context state for the client device occurs between the configuration 602 and 604. For instance, the component system 122 may ascertain, based on context information 308, that the display device 110c is no longer facing a user of the client device 102 and deactivate one or more client device components used to control display device 110c. Thus, the component system 122 is configured to alter a number of client device components running in parallel based on a change in posture of the client device 102.

In an alternative example, the component system 122 may determine, based on context information 308, that the user of the client device 102 has manipulated the client device from the configuration 602 to the configuration 604 in order to enable another user to simultaneously interact with the client device 102. For instance, the context state module 128 may detect the change in client device 102 posture and detect that the display device 110c is facing a different user in the configuration 604. Continuing this example, the component system 122 may configure the client device 102 for simultaneous interaction by multiple users, such as by generating duplicate instances of client device components and simultaneously displaying the duplicate instances at display devices 110c and 110d. Thus, the component system 122 can may cause the display device 110c to display the user interface 518 and cause the display device 110d to display the user interface 516, as described above with respect to FIG. 5.

Thus, upon detecting a change to one or more of a hardware state, a shell state, or a context state of the client device 102, the component system 122 generates an output that specifies a subset of client device components to be activated, such as a subset of the components introduced in FIG. 2. In this manner, the component system 122 dynamically adapts the client device 102 during runtime to account for device state changes.

Figure 7:
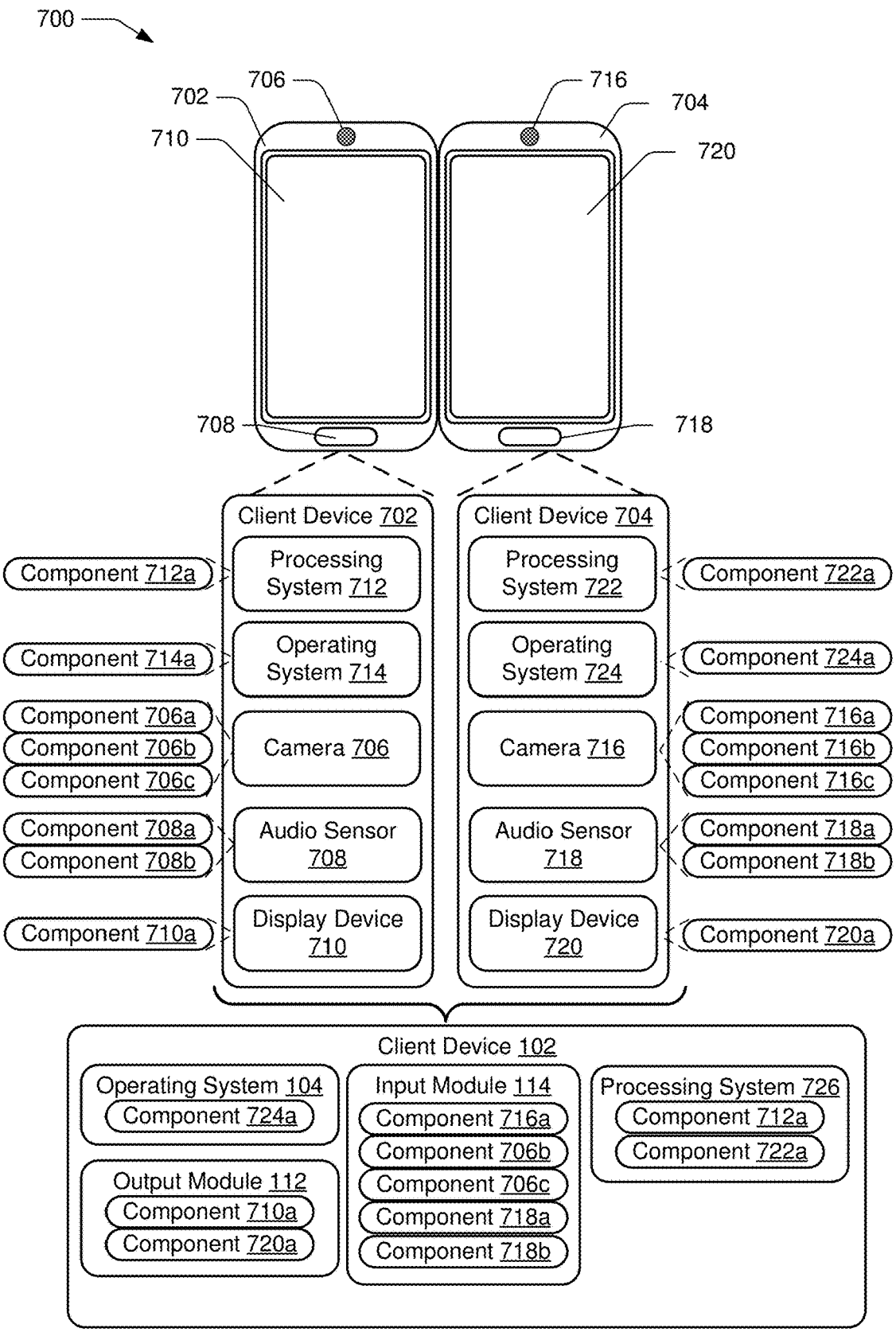
FIG. 7 depicts an example implementation scenario for configuring interchangeable device components based on a combination of devices in accordance with one or more implementations.

FIG. 7 depicts an example implementation scenario 700 for configuring client device 102 based on at least one of a hardware state, a shell state, or a context state of the client device. The scenario 700 is representative of functionality provided by the component system 122, as introduced above. In the scenario 700, hardware, shell, and context state changes are described in the context of a client device establishing or terminating connections to a different computing device. Using techniques described herein, the component system 122 dynamically activates and/or deactivates various components of the client device based on components that are available for use by the client device, given a current state of the client device 102. In some implementations, the component system 122 activates and deactivates individual components of the client device 102 via the configuration output 310 of FIG. 3.

The scenario 700 includes a client device 702 that is communicatively connectable to and disconnectable from a client device 704. The client devices 702, 704, for instance, represent different instances of the client device 102. In this particular example, the client devices 702, 704 are connected to each other such that the client devices 702, 704 function as a single integrated instance of the client device 102. The client devices 702, 704, for example, can exchange data and distribute various computing-related tasks between the two devices to present a unified user experience. The client devices 702, 704 can be connected in various ways, such as via a physical connection that enables physical and signal connectivity between the devices. One example of such a connection is the hinge 606 described with reference to FIG. 6. Alternatively or additionally, the client devices 702, 704 can be interconnected via a wireless connection that enables data and/or power to be wirelessly communicated between the client devices 702, 704.

The client devices 702, 704 are also able to function independently via the their own separate integrated functionality. The client devices 702, 704, for example, can be disconnected to represent separate functional instances of the client device 102. As further described below, each of the client devices 702, 704 includes separate functionality that is independently operable to provide different computing experiences, such as separate display devices, separate processors, separate operating systems, and so forth. In the following discussion, the client devices 702, 704 will be discussed in the context of single instance of the client device 102.

Further to the scenario 700, the client device 702 includes a camera 706, an audio sensor 708, and a display device 710, each of which may be associated with one or more interchangeable components, as indicated by components 706a-706c, 706a, 706b, and 710a. Client device 702 additionally includes a processing system 712 with an associated component 712a, and an operating system 714 with an associated component 714a.

Further, the client device 704 includes a camera 716, an audio sensor 718, and a display device 720, each of which may be associated with one or more interchangeable components, as indicated by components 716a-716c, 718a, 718b, and 720a. Client device 704 additionally includes a processing system 722 with an associated component 722a and an operating system 724 with an associated component 724b.

In an example implementation, the individual components 706a-706c represent different functionalities of the camera 706. For instance, component 706a may represent functionality of an image processor, component 706b may represent functionality of a lens, and component 706c may represent functionality of an image sensor, which collective represent functionality of the camera 706 for client device 702. Further, component 708a may represent functionality of an analog to digital converter (ADC) and component 708b may represent functionality of a microphone, which together represent functionality of the audio sensor 708 for client device 702.

Continuing this example implementation, component 716a may represent functionality of an image processor, component 716b may represent functionality of a lens, and component 716c may represent functionality of an image sensor, which collective represent functionality of the camera 716 for client device 704. Further to this example implementation, component 718a may represent functionality of an ADC and component 718b may represent functionality of a microphone, which together represent functionality of the audio sensor 718 for client device 704. Although client devices 702 and 704 are described as having similar components for their respective cameras 706 and 716 and audio sensors 708 and 718, this example implementation is not intended to be limiting. For instance, client device 702 may be associated with interchangeable components that are different from interchangeable components of the client device 704, such that no interchangeable component from client device 702 overlaps with an interchangeable component of client device 704.

Using techniques described herein, the component system 122 configures the client device 102 by activating a subset of components from the client devices 702, 704. In the example scenario 700, the client device 102 includes an operating system 104, the functionality of which is configured by the component system 122 through the selection and activation of component 724a. In implementations, the component 724a may be selected for configuring the operating system 104 based on shell information 306. For instance, the component system 122 may ascertain from shell information 306 that the component 724a corresponds to a version of the operating system 104 that has been updated more recently than a version of the operating system corresponding to component 714a. Alternatively or in addition to shell information 306, the component 724a may be selected and activated based on at least one of hardware information 304 or context information 308.

Continuing the example implementation 700, the client device 102 includes the output module 112, the functionality of which is configured by the component system 122 through selection and activation of components 710a and 720a. Thus, in the example implementation 700, the client device 102 is configured to leverage both the display device 710 of client device 702 and the display device 720 of client device 704 to function as output mechanisms for client device 102. In this manner, the component system 122 dynamically configures the output module 112 based on hardware information specifying that display devices 710 and 720 are connected and available for use by the client device 102. Alternatively or in addition to hardware information 308, the components 710a and 720a may be selected and activated based on at least one of shell information 306 or context information 308.

The client device additionally includes the input module 114, functionality of which is configured by the component system 122 through selection and activation of components 716a, 706b, 706c, 718a, and 718b. Thus, in the example implementation 700, the client device 102 is configured to include a camera that incorporates the image processor of camera 716, as represented by component 716a, and the lens and image sensor of camera 706, as represented by components 706b and 706c. The component system 122, for instance, may determine from context information 308 that the client device 102 is in a low-light setting and that optimum image quality can be obtained by using a combination of interchangeable components from cameras 706 and 716.

Further, the client device 102 is configured to include audio sensor 718, as represented by the components 718a and 718b. In some implementations, selection and activation of the components for input module 114 is performed based on one or more of a shell state, a hardware state, or a context state of the client device 102. For instance, shell information 306 may describe that the audio sensor 708 has enhanced sound sensing performance in comparison to the audio sensor 718, but context information 308 may describe that a user's current grip on the client device 702 is covering the audio sensor 708. Accordingly, the component system 122 is configured to select components of the audio sensor 718 based on the current context of the client device 102.

Further to the scenario 700, the client device 102 includes a processing system 726, the functionality of which is configured by the component system 122 through selection and activation of components 712a and 722a. Thus, in the example implementation 700, the client device 102 is configured to leverage both processing systems of client devices 702 and 704 to execute functionality of the client device 102. In this manner, the component system 122 dynamically configures the processing system 726 based on hardware information 304, which specifies that the processing systems 712 and 722 are connected and available for use by the client device 102. Alternatively or in addition to hardware information 308, the components 712a and 722a may be selected and activated based on at least one of shell information 306 or context information 308.

Accordingly, techniques described herein enable dynamic configuration of a device that can adapt to changes of a hardware state, a shell state, and/or a context state of the device. Similarly, techniques described herein can be used to dictate a manner in which an application interacts with a computing device, even if the application is not developed to be aware of a current state of the computing device on which it is executing.

Having described some example implementation scenarios, consider now some example procedures for interchangeable device components in accordance with one or more implementations. Generally, the procedures may be implemented in the environment 100 described above, the system 1100 of FIG. 11, and/or any other suitable environment. The procedures, for example, describe example ways for implementing various aspects of the scenarios described above. In at least some implementations, steps described for the various procedures are performed automatically and independent of user interaction.

Figure 8:
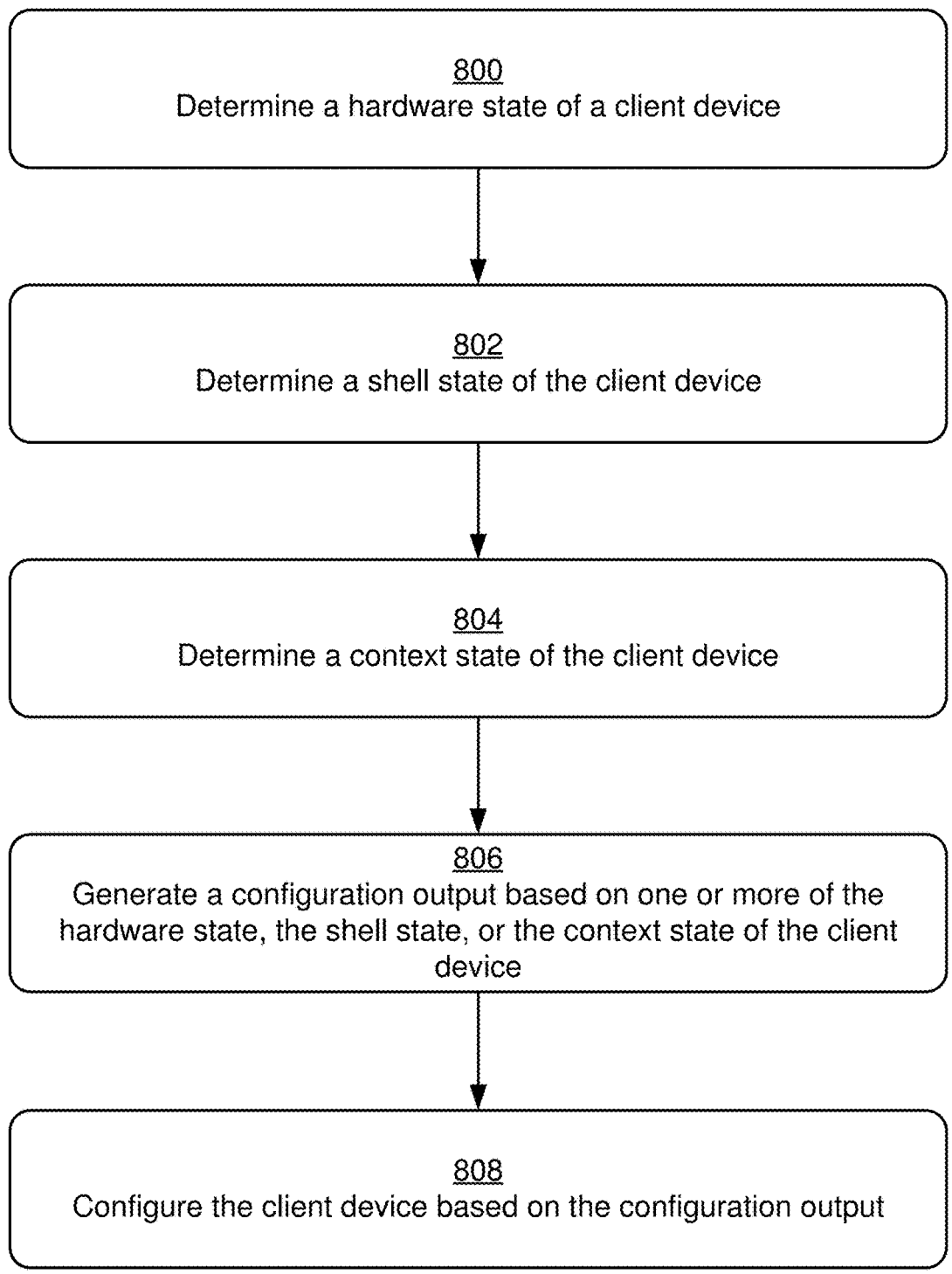
FIG. 8 is a flow diagram that describes steps in a method for generating an output based on a hardware state, a shell state, and a context state of a client device in accordance with one or more implementations.

FIG. 8 is a flow diagram that describes steps in an example method for generating an output based on one or more or a hardware state, a shell state, or a context state of a client device in accordance with one or more implementations.

Step 800 determines a hardware state of a client device. The hardware state module 124, for instance, determines hardware information 304 that describes a hardware configuration of the client device 102, one or more input mechanisms connected to the client device 102, and one or more output mechanisms connected to the client device 102. For example, the hardware information 304 includes information that describes the input mechanisms 202 of the client device 102, such as the digitizer 204, sensors 206, sensor components 206a-206c, touch input devices 208, analog input devices 210, keyboard and mouse input mechanisms 408, and voice control 412 as described above and illustrated in FIGS. 2 and 4. Alternatively or additionally, the hardware information 304 includes information describing one or more output mechanisms of the client device 102, such as the display device 110.

In implementations where the client device 102 is communicatively coupled to a different computing device, the hardware information 304 describes a hardware configuration of the different device, one or more input mechanisms connected to the different computing device, and one or more output mechanisms connected to the different computing device. For instance, the hardware information 304 may describe a hardware configuration of both client devices 702 and 704, along with their respective processing systems 718 and 722, cameras 706 and 712, audio sensors 708 and 714, and display devices 710 and 716, as described above and illustrated in FIG. 7.

Step 802 determines a shell state of the client device. The shell state module 126, for instance, determines shell information 306 that describes software and firmware installed on the client device 102. For instance, the shell information 306 includes information that describes the installed and available versions of the operating system 104, along with installed and available operating system components 104a-104c, as described above and illustrated with respect to FIG. 2. Likewise, the shell information 306 includes information describing current and available versions of the applications 106, along with any interchangeable components associated with the applications 106. Alternatively or additionally, the shell information 306 includes information describing current and available versions of the output module 112, its associated components 112a-112c, the input module 114, and its associated components 114a-114c.

In implementations where the client device 102 is communicatively coupled to a different computing device, the shell information 306 describes a shell state of the client device 102 and the different device, such as respective operating systems 720 and 724 of client devices 702 and 704, as described above and illustrated with respect to FIG. 7.

Step 804 determines a context state of the client device. The context state module 128, for instance, determines context information 308 that describes the client device 102 in relation to a user of the device and how the user is using the device. For instance, the context state of the client device 102 can be described by data or signals associated with one or more of a user's grip on the device, a relative position of the device, sound, behavioral data, Hall Effect, user settings, visual data, external connections, and so forth. This is not an exhaustive list, and is only representative of various information that can be used to describe a context state of the client device 102, as described herein.

For example, the context information 308 may describe whether an adult user 406 or child user 410 is interacting with the client device 102, as described above and illustrated in FIG. 4. Alternatively or additionally, the context information 308 may specify whether a single user or multiple users are simultaneously interacting with the client device 102, as described above and illustrated in FIG. 5. Alternatively or additionally, the context information 308 may describe a current posture of the client device 102, as described above and illustrated in FIG. 6.

Step 806 generates a configuration output based on one or more of the hardware state, the shell state, or the context state of the client device. The component system 122, for instance, generates configuration output 310 as described above and illustrated in FIG. 3. The configuration output 310 specifies a subset of client device components, such as a subset of the components illustrated in FIGS. 2 and 7 to be used in performing functionality of the client device 102.

Step 808 configures the client device based on the configuration output. The component system 122, for instance, applies configuration data from the configuration output 310 to enable and/or disable various components of the client device 102. For instance, the component system 122 uses the configuration output 310 to activate a specific subset of client device components to dynamically configure the client device 102 based on a current state of the device.

Thus, FIG. 8 describes a general procedure for generating an output that configures device components based on one or more of a hardware state, a shell state, or a context state of the client device. In implementations, the operations of FIG. 8 can be performed by a computing device implementing the component system 122, such as the client device 102 of FIG. 1.

Figure 9:
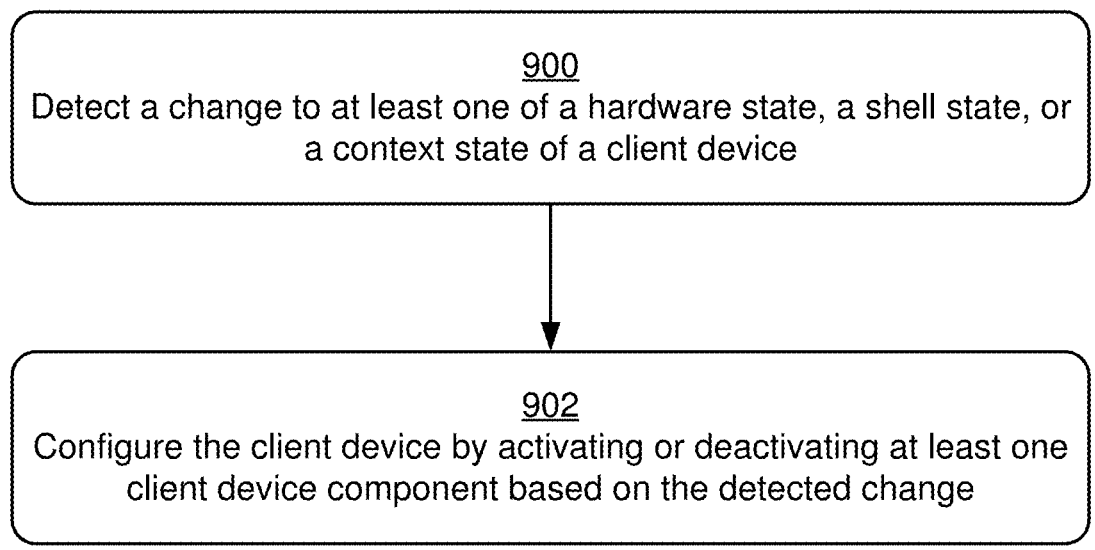
FIG. 9 is a flow diagram that describes steps in a method for configuring a client device in response to detecting a change in state in accordance with one or more implementations.

FIG. 9 is a flow diagram that describes steps in an example method for configuring a client device based on a detected state change in accordance with one or more implementations. In at least one implementation, the flow diagram of FIG. 9 represents a way of performing step 806 of FIG. 8.

Step 900 detects a change to at least one of a hardware state, a shell state, or a context state of a client device. The hardware state module 124, for instance, may determine a hardware state of the client device, as described in step 800 of FIG. 8, and store information describing this hardware state, such as in memory/storage 116 as illustrated in FIG. 1. Thereafter, the hardware state module 124 may continue to monitor the hardware state of the client device and compare the monitored hardware state to the stored information to determine when a change in hardware state occurs. For instance, the hardware state module 124 may monitor the client device to determine whether mouse and keyboard input mechanisms 408 are currently connected to the client device 102, as described above and illustrated in FIG. 4. Alternatively or additionally, the hardware state module 124 may monitor the client device 702 to determine that processing systems 718 and 722, cameras 706 and 712, audio sensors 708 and 714, and display devices 710 and 716 are available to the client device 702 upon establishing a connection with client device 704, as described above and illustrated in FIG. 7.

Similarly, the shell state module 126 may determine a shell state of the client device, as described in step 802 of FIG. 8, and store information describing this shell state, such as in memory/storage 116 as illustrated in FIG. 1. Thereafter, the shell state module 126 may continue to monitor the shell state of the client device and compare the monitored shell state to the stored information to determine when a change in shell state occurs. For instance, the shell state module 126 may monitor the client device 702 to determine that both operating system components 720a and 724a are available to the client device upon establishing a connection with client device 704, as described above and illustrated in FIG. 7.

Further, the context state module 128 may determine a context state of the client device, as described in step 804 of FIG. 8, and store information describing the context state, such as in memory/storage 116 as illustrated in FIG. 1. Thereafter, the context state module 128 continues to monitor the context state of the client device and compares the monitored context state to the stored information to determine when a change in context state occurs. For instance, the context state module 128 may detect a change in context state when a child user 410 interacts with a client device 102 that was previously interacted with by an adult user 406, as described and illustrated with respect to FIG. 4. Alternatively or additionally, the context state module 128 may detect a change in context state when an additional user begins to interact with the client device 102, as described and illustrated with respect to FIG. 5. As another example, the context state module 128 may detect a change in context state when the client device 102 transitions from a first posture to a second posture, as described and illustrated with respect to FIG. 6.

Step 902 configures the client device by activating or deactivating at least one client device component based on the detected change in state. The component system 122, for instance, may activate one or more client device components and/or deactivate one or more different client device components illustrated in FIGS. 2 and 7 in response to detecting a change in one or more of a hardware state, shell state, or context state of the client device 102. The one or more client device components to be activated and/or deactivated in response to the detected state change may be specified in the configuration output 310, as illustrated in FIG. 3. Thus, by activating or deactivating individual client device components, the component system 122 is configured to adapt the client device 102 to dynamically adjust to state changes. For instance, the component system 122 can adapt the client device between configurations 402 and 404 of FIG. 4, between configurations 502 and 504 of FIG. 5, between configurations 602 and 604 of FIG. 6, between configurations 702 and 704 of FIG. 7, and so on.

Figure 10:
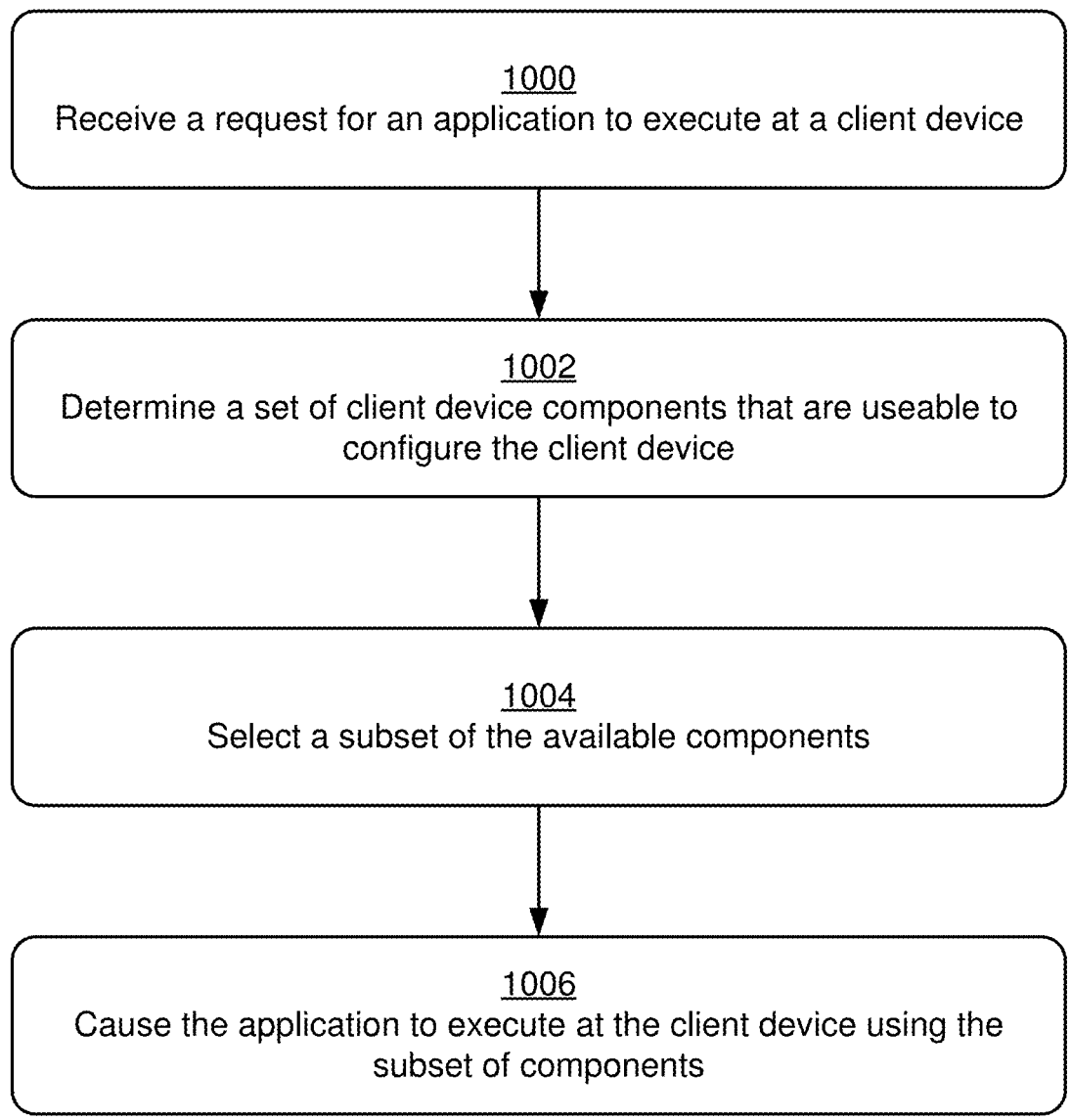
FIG. 10 is a flow diagram that describes steps in a method for executing an application using interchangeable device components in accordance with one or more implementations.

FIG. 10 is a flow diagram that describes steps in a method for causing an application to execute at a client device using a subset of client device components in accordance with one or more implementations. In at least one implementation, the flow diagram of FIG. 10 represents a way of performing step 806 of FIG. 8.

Step 1000 receives a request for an application to execute at a client device. The component system 122, for instance, detects that an application 106 is requesting to execute at the client device 102. In accordance with one or more implementations, step 1000 is performed in response to receiving user input at the client device 102 that commences execution of the application 106, such as via user input received from one or more input mechanisms 202 as illustrated in FIG. 2.

Step 1002 determines a set of client device components that are useable to configure the client device. The component system 122, for instance, analyzes the operating system 104, the applications 106, the communication module 108, the output module 112, and the input module 114 to identify interchangeable components that are associated with each, such as components 104a-104c, 112a-112c, and 114a-114c, as illustrated in FIG. 2. By analyzing the output module 112 and the input module 114, the component system is additionally configured to identify output devices and input devices that are available for use by the client device 102, such as the display device 110, the digitizer 204, sensors 206 and sensor components 206a-206c, touch input devices 208, and analog input devices 210, as illustrated in FIGS. 1 and 2. Alternatively or additionally, the set of client device components that are useable to configure the client device represents client device components implemented across multiple connected client devices, such as the components of client devices 702 and 704, as illustrated in FIG. 7.

Step 1004 selects a subset of the available client device components. The component system 122, for instance, determines a current hardware state, current shell state, and current context state of the client device 102, as described with respect to steps 800-804 of FIG. 8. Based on one or more of the hardware state, shell state, or context state of the client device, the component system selects one or more client device components for use in configuring the client device 102 and designates the one or more client device components as the subset of the available client device components. In some implementations, the subset of client device components represents a change in a number of client device components running in parallel in comparison to a previous number of client device components running in parallel on the client device 102.

Step 1006 causes the application to execute at the client device using the subset of client device components. The component system 122, for example, generates a configuration output 310 and communicates the configuration output 310 to the application 106 in a manner that represents the client device 102 as comprising the subset of client device components. In some implementations, the configuration output 310 is generated such that the client device 106 is represented to the application 106 as consisting of the subset of client device components. For instance, in the illustrated example of FIG. 7, the configuration output 310 can be generated such that the connected client devices 702 and 704 are represented to application 106 as a single client device 102. In this manner, the component system 122 can dictate how the client device 102 is represented to the application 106 and thus control a user experience of the application without requiring modification of underlying application code. Further, the component system 122 can force different applications 106 to behave in a consistent manner, even if different applications are designed to leverage different hardware functionalities.

Thus, the component system 122 causes applications to execute at the client device 102 in a particular manner by representing the client device as a subset of client device components, in order to adapt user experiences of the respective applications to hardware, shell, and context states of the client device. Thus, the component system 122 causes applications to dynamically adapt to client device state changes, in a manner that does not require application developers to design applications to account for variations in device hardware, shell, or context states.

Having described some example implementation details, consider now a discussion of an example system and device in accordance with one or more implementations.

Figure 11:
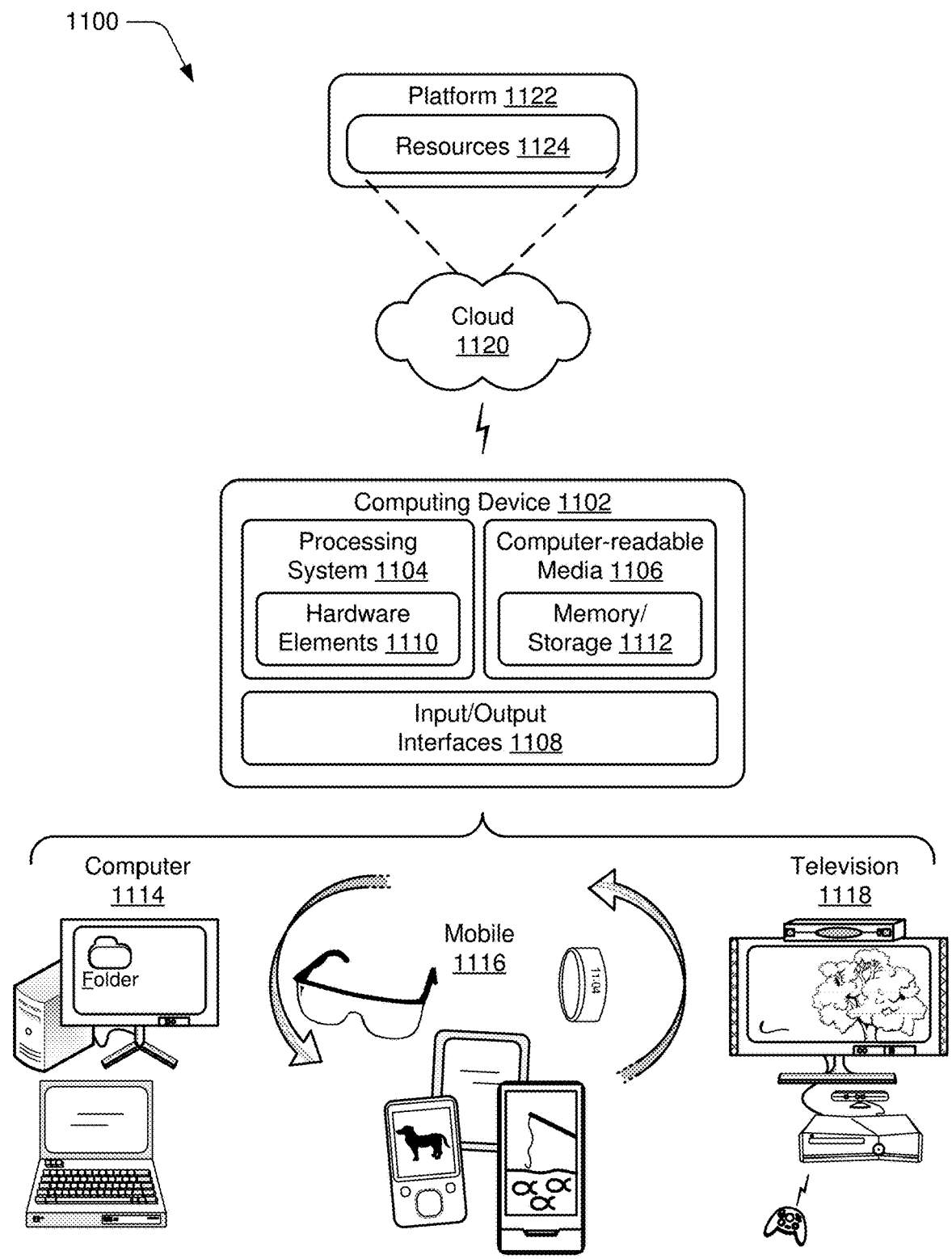
FIG. 11 illustrates an example system and computing device as described with reference to FIG. 1, which are configured to implement implementations of techniques described herein.

FIG. 11 illustrates an example system generally at 1100 that includes an example computing device 1102 that is representative of one or more computing systems and/or devices that may implement various techniques described herein. For example, the client device 102 discussed above with reference to FIG. 1 can be embodied as the computing device 1102. The computing device 1102 may be, for example, a server of a service provider, a device associated with the client (e.g., a client device), an on-chip system, and/or any other suitable computing device or computing system.

The example computing device 1102 as illustrated includes a processing system 1104, one or more computer-readable media 1106, and one or more Input/Output (I/O) Interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1106 is illustrated as including memory/storage 1112. The memory/storage 1112 represents memory/storage capacity associated with one or more computer-readable media. The memory/storage 1112 may include volatile media (such as random access memory (RAM)) and/or nonvolatile media (such as read only memory (ROM), Flash memory, optical disks, magnetic disks, and so forth). The memory/storage 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), motion functionality (e.g., accelerometers or other sensors that are configured to detect physical motion), a camera (e.g., which may employ visible or non-visible wavelengths such as infrared frequencies to detect movement that does not involve touch as gestures), six degrees of freedom controllers such as used in virtual reality and augmented reality technologies, and so forth. Examples of output devices include a display device (e.g., a monitor or projector), speakers, a printer, a network card, tactile-response device, head mounted displays (e.g., for virtual reality and augmented reality applications), and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1110 and computer-readable media 1106 are representative of instructions, modules, programmable device logic and/or fixed device logic implemented in a hardware form that may be employed in some implementations to implement at least some aspects of techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of modules that are executable by the computing device 1102 as software may be achieved at least partially in hardware, e.g., through use of computer-readable storage media and/or hardware elements 1110 of the processing system. The instructions and/or functions may be executable/operable by one or more articles of manufacture (for example, one or more computing devices 1102 and/or processing systems 1104) to implement techniques, modules, and examples described herein.

As further illustrated in FIG. 11, the example system 1100 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1100, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1102 may assume a variety of different configurations, such as for computer 1114, mobile 1116, and television 1118 uses. Each of these configurations includes devices that may have generally different constructs and capabilities, and thus the computing device 1102 may be configured according to one or more of the different device classes. For instance, the computing device 1102 may be implemented as the computer 1114 class of a device that includes a personal computer, desktop computer, a multi-screen computer, laptop computer, netbook, and so on.

The computing device 1102 may also be implemented as the mobile 1116 class of device that includes mobile devices, such as a mobile phone, portable music player, portable gaming device, a tablet computer, a wearable device (e.g., a watch, glasses, an article of clothing, etc.), a multi-screen computer, and so on. The computing device 1102 may also be implemented as the television 1118 class of device that includes devices having or connected to generally larger screens in casual viewing environments. These devices include televisions, set-top boxes, gaming consoles, and so on.

Techniques described herein may be supported by these various configurations of the computing device 1102 and are not limited to the specific examples of techniques described herein. For example, functionalities discussed with reference to the client device 102 may be implemented all or in part through use of a distributed system, such as over a "cloud" 1120 via a platform 1122 as described below.

The cloud 1120 includes and/or is representative of a platform 1122 for resources 1124. The platform 1122 abstracts underlying functionality of hardware (e.g., servers) and software resources of the cloud 1120. The resources 1124 may include applications and/or data that can be utilized while computer processing is executed on servers that are remote from the computing device 1102. Resources 1124 can also include services provided over the Internet and/or through a subscriber network, such as a cellular or Wi-Fi network.

The platform 1122 may abstract resources and functions to connect the computing device 1102 with other computing devices. The platform 1122 may also serve to abstract scaling of resources to provide a corresponding level of scale to encountered demand for the resources 1124 that are implemented via the platform 1122. Accordingly, in an interconnected device embodiment, implementation of functionality described herein may be distributed throughout the system 1100. For example, the functionality may be implemented in part on the computing device 1102 as well as via the platform 1122 that abstracts the functionality of the cloud 1120.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different implementations are described. It is to be appreciated and understood that each implementation described herein can be used on its own or in connection with one or more other implementations described herein. Further aspects of techniques discussed herein relate to one or more of the following implementations:

A system for configuring a client device based on a configuration output that specifies an interchangeable component to be activated, the system comprising: at least one processor; and one or more computer-readable storage media including instructions stored thereon that, responsive to execution by the at least one processor, cause the system to perform operations including: determining a hardware state of a client device based on hardware information describing at least one hardware mechanism of the client device; determining a shell state of the client device based on shell information describing an operating system installed on the client device; determining a context state of the client device based on context information describing a current context of the at least one hardware mechanism and a current context of the operating system, relative to a user or a surrounding environment of the client device; generating a configuration output that specifies at least one interchangeable component to be activated by the client device, based on the hardware state, the shell state, and the context state of the client device; and configuring the client device based on the configuration output.

In addition to any of the above described systems, any one or combination of: wherein the at least one hardware mechanism includes an input mechanism of the client device and the hardware information describes one or more interchangeable components that are available to configure functionality of the input mechanism; wherein the at least one hardware mechanism includes an output mechanism of the client device and the hardware information describes one or more interchangeable components that are available to configure functionality of the output mechanism; wherein the shell information describes one or more interchangeable components that are available to configure functionality the operating system; wherein the context information describes at least one of the user's grip on the client device, a position of the client device relative to the user or the surrounding environment, a sound received by the client device, user profile information for the user, a posture of the client device, visual information received by the client device, a connection between the client device and an external device, or a number of users interacting with the client device; wherein the at least one interchangeable component includes a subset of interchangeable components available to the client device and the output causes the client device to perform operations using the subset of interchangeable components; and wherein the at least one interchangeable component includes a subset of interchangeable components available to an application executing on the client device and the output causes the application to execute on the client device using the subset of interchangeable components.

A computer-implemented method for configuring a client device to perform an operation using a subset of interchangeable components, the computer-implemented method comprising: detecting at least one of a change to a hardware state of a client device based on a change in available hardware mechanisms, a change to a shell state of the client device based on a change in version to an operating system or an application on the client device, or a change to a context state of the client device based on a change in how the client device is being used relative to a surrounding environment; and responsive to detecting the change, configuring the client device by selecting a subset of interchangeable components that are available to the client device, activating the subset of interchangeable components, and causing the client device to perform operations using the subset of interchangeable components.

In addition to any of the above described methods, any one or combination of: wherein detecting the change to the hardware state of the client device comprises detecting that the client device connects to an external device, and configuring the client device comprises enabling the client device to perform operations using one or more hardware mechanisms of the external device; wherein detecting the change to the hardware state of the client device comprises detecting that the client device connects to an external device, the operations further comprising determining a set of interchangeable components that are installed on the client device, determining a set of interchangeable components that are installed on the external device, and the subset of interchangeable components includes interchangeable components from the set installed on the client device and from the set installed on the external device; wherein detecting the change to the hardware state of the client device comprises detecting that the client device is connected to a car, detecting the change to the context state of the client device comprises detecting that the client device and the car are moving, and configuring the client device comprises disabling a display of the client device by omitting an interchangeable component for the display from the subset of interchangeable components; wherein detecting the change to the context state of the client device comprises detecting an increase in a number of users interacting with the client device, the operations further comprising generating a duplicate instance of each interchangeable component in the subset of interchangeable components and outputting multiple user experiences, the multiple user experiences including a user experience for each of the number of users interacting with the client device; wherein detecting the change to the context state of the client device comprises detecting a change in posture of the client device and a number of interchangeable components included in the subset of interchangeable components is different from a number of interchangeable components that were active prior to the change in posture of the client device; wherein detecting the change to the context state of the client device includes determining that a user of the client device has accessibility needs and the subset of interchangeable components are selected to accommodate the accessibility needs; and wherein detecting the change and configuring the client device are performed during runtime at the client device and the subset of interchangeable components are configured to be run concurrently by the client device.

A computer-implemented method for configuring a client device to be executable using a subset of components, the computer-implemented method comprising: receiving a request for an application to execute at a client device; determining a set of client device components that are useable to configure functionality of the client device in response to receiving the request; selecting a subset of components from the set of client device components based on one or more of a hardware state of the client device describing at least one hardware mechanism of the client device, a shell state of the client device describing the application and an operating system installed on the client device, or a context state of the client device describing a current context of the at least one hardware mechanism, the application, and the operating system, relative to a user or a surrounding environment of the client device; and causing the application to execute at the client device using the subset of components.

In addition to any of the above described methods, any one or combination of: wherein the subset of components omits at least one component from the set of client device components that is available for use by the client device; wherein a device type of the client device is a first device type, the application is designed to provide a first user experience for the first device type and a different user experience for a second device type, the subset of components represents the client device as the second type, and causing the application to execute at the client device comprises causing the application to provide the different user experience; wherein the at least one hardware mechanism includes at least one output mechanism of the client device and the hardware state of the client device includes information describing one or more interchangeable components that are available to configure functionality of the at least one output mechanism; and wherein the current context of the at least one hardware mechanism, the application, and the operating system is determined based on at least one of a user's grip on the client device, a relative position of the client device, a sound received by the client device, user profile information for the user, a posture of the client device, visual information received by the client device, a connection between the client device and an external device, or a number of users interacting with the client device.

What is claimed is:
1. A computer-implemented method comprising:
determining that a computer system of a vehicle has paired with a client device during runtime of the client device;

in response to determining that the computer system of the vehicle has paired with the client device, executing processing operations that comprise:
  determining a hardware state of the client device based on evaluation of hardware information describing at least one hardware mechanism of the client device;
  determining a context state of the client device indicating a current state of application components for the client device and the computer system of the vehicle;
  generating a configuration output that specifies an operation state of a subset of the application components based on the hardware state of the client device and the context state of the client device; and
  configuring the client device to modify the operation state of the subset of application components based on an evaluation of the configuration output and the computer system of the vehicle being paired with the client device.

2. The computer-implemented method as recited in claim 1, wherein the processing operations, executed in response to determining that the computer system of the vehicle has paired with the client device, further comprise: determining a shell state of the client device based on evaluation of shell information describing a state of software of the application or service that is installed on the client device, and wherein the generating of the configuration output occurs based on evaluation of the hardware state of the client device, the shell state of the client device and the context state of the client device.

3. The computer-implemented method as recited in claim 1, wherein the determining that the computer-system of the vehicle has paired with the client device comprises detecting that an external device is connected with the client device.

4. The computer-implemented method as recited in claim 1, wherein the processing operations, executed in response to determining that the computer system of the vehicle has paired with the client device, further comprise: receiving, from the computer system of the vehicle, an indication that the vehicle is in motion, and wherein the configuring of the client device to modify the operation state of the subset of application components occurs based on the configuration output, and the indication that the vehicle is in motion.

5. The computer-implemented method as recited in claim 3, wherein the external device comprises one or more display devices, and wherein the detecting that the external device is connected with the client device comprises detecting that the one or more display devices is connected with the client device.

6. A system comprising:
at least one processor; and
one or more computer-readable storage media including instructions stored thereon that, responsive to execution by the at least one processor, cause the system to perform processing operations that comprise:
  determining a type of change in usage of one or more external devices comprising one or more display devices, connected with a client device comprising an integrated display, during runtime of the client device, wherein the determining comprises detecting an activation of the one or more display devices connected with the client device,
  in response to determining the type of change in usage of the one or more external devices, executing processing operations that comprise:
    determining a hardware state of the client device based on evaluation of hardware information describing at least one hardware mechanism of the client device,
    determining a context state of the client device indicating a current state of application components for the client device and the one or more external devices,
    generating a configuration output that specifies an operation state of a subset of the application components based on the hardware state of the client device and the context state of the client device, and
    configuring the client device to modify the operation state of the subset of application components based on an evaluation of the configuration output and the type of change in usage of the one or more external devices.

7. The system as recited in claim 6, wherein the processing operations, executed by the at least one processor, further comprise: determining a shell state of the client device based on evaluation of shell information describing a state of software of the application or service that is installed on the client device, and wherein the generating of the configuration output occurs based on evaluation of the hardware state of the client device, the shell state of the client device and the context state of the client device.

8. The system as recited in claim 6, wherein the determining of the type of change in usage of the one or more external devices comprises detecting that an external device is connected with the client device.

9. The system as recited in claim 8, wherein the external device is a computer system of a vehicle, and wherein the detecting that the one or more external devices is connected with the client device comprises detecting that the computer system of the vehicle pairs with the client device.

10. The system as recited in claim 9, wherein the processing operations, executed by the at least one processor, further comprise: receiving, from the computer system of the vehicle, an indication that the vehicle is in motion, and wherein the configuring of the client device to modify the operation state of the subset of application components occurs based on the configuration output, the type of change in usage of the one or more external devices and the indication that the vehicle is in motion.

11. The system as recited in claim 8, wherein the detecting that the one or more external devices is connected with the client device further comprises detecting that the one or more display devices is connected with the client device.

12. The system as recited in claim 6, wherein the determining of the type of change in usage of the one or more external devices further comprises detecting a change in positioning of the one or more display devices.

13. The system as recited in claim 12, wherein the generating of the configuration output that specifies the operation state of the subset of the application components comprises identification of a primary display from a display device of the one or more display devices, and wherein a modification of the operation state of the subset of application components changes the display device to a secondary display based on evaluation of the configuration output and the type of change in usage of the one or more external devices.

14. A computer-implemented method comprising:
  detecting a type of user action that affects usage of a sensor of a client device during runtime of the client device;

in response to determining the user action that affects usage of the sensor of the client device, executing processing operations that comprise:
- determining a hardware state of the client device based on evaluation of hardware information describing at least one hardware mechanism of the client device,
- determining a shell state of the client device based on evaluation of shell information describing a state of software of an application, operating system, or service that is installed on the client device;
- determining a context state of the client device indicating a current state of application components for the client device and the one or more external devices,
- generating a configuration output that specifies an operation state of a subset of the application components based on the hardware state of the client device, the shell state of the client device, and the context state of the client device, and
- configuring the client device to modify the operation state of the subset of application components based on an evaluation of the configuration output and the type of user action that affects usage of the sensor of the client device.

15. The computer-implemented method as recited in claim 14, wherein the sensor of the client device is a camera sensor of the client device, wherein the detecting of the type of user action that affects usage of the sensor of the client device comprises a user covering the camera sensor of the client device, and wherein the configuring of the client device to modify the operation state of the subset of application components comprises de-activating the camera sensor.

* * * * *